(12) United States Patent
Takagi

(10) Patent No.: US 8,600,114 B2
(45) Date of Patent: Dec. 3, 2013

(54) IMAGE PROCESSING APPARATUS AND IMAGE PROCESSING METHOD

(75) Inventor: Yoshinori Takagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 447 days.

(21) Appl. No.: 13/045,662

(22) Filed: Mar. 11, 2011

(65) Prior Publication Data

US 2011/0228121 A1    Sep. 22, 2011

(30) Foreign Application Priority Data

Mar. 19, 2010  (JP) ................................ P2010-063661
Mar. 19, 2010  (JP) ................................ P2010-063662

(51) Int. Cl.
*G06T 7/20*    (2006.01)
(52) U.S. Cl.
USPC ........................................................ 382/107
(58) Field of Classification Search
None
See application file for complete search history.

(56) References Cited

U.S. PATENT DOCUMENTS

| 5,548,409 | A | 8/1996 | Ohta et al. |
| 2009/0021576 | A1* | 1/2009 | Linder et al. .................... 348/36 |
| 2011/0012989 | A1* | 1/2011 | Tseng et al. .................... 348/36 |

FOREIGN PATENT DOCUMENTS

| JP | 6 326965 | 11/1994 |
| JP | 7 298137 | 11/1995 |

\* cited by examiner

*Primary Examiner* — Anand Bhatnagar
*Assistant Examiner* — Samah Beg
(74) *Attorney, Agent, or Firm* — Frommer Lawrence & Haug LLP; William S. Frommer

(57) ABSTRACT

Disclosed herein is an image processing apparatus including: a representative image creation block configured to create, as a representative image, a union image with images of screens making up a predetermined scene linked with each other; and a symbol drawing block configured, on the basis of a full-screen movement of each screen in the predetermined scene, to draw a symbol indicative of the full-screen movement on a rim of the representative image created by the representative image creation block, wherein the symbol drawing block draws the symbol indicative of the full-screen movement in accordance with a display size of the representative image to be displayed on an output device.

18 Claims, 31 Drawing Sheets

FIG.3

| FRAME No. | FULL-SCREEN MOVEMENT Mv | CUMULATIVE NUMBER | TOTAL VALUE | |
|---|---|---|---|---|
| 1 | 0 | 0 | 0 | |
| 2 | 0 | 0 | 0 | |
| 3 | 0 | 0 | 0 | |
| 4 | 0 | 0 | 0 | |
| 5 | 0 | 0 | 0 | 10 FRAMES ACCUMULATED |
| 6 | 0 | 0 | 0 | |
| 7 | 0 | 0 | 0 | |
| 8 | 0 | 0 | 0 | |
| 9 | 0 | 0 | 0 | |
| 10 | 0 | 10 | 0 | |
| 11 | 50 | 1 | 50 | |
| 12 | 50 | 1 | 100 | |
| 13 | 50 | 1 | 150 | 7 FRAMES AT MOVEMENT 50 |
| 14 | 50 | 1 | 200 | |
| 15 | 50 | 1 | 250 | |
| 16 | 50 | 1 | 300 | |
| 17 | 50 | 1 | 350 | |
| 18 | 100 | 1 | 450 | ACCELERATING |
| 19 | 150 | 1 | 600 | |
| 20 | 200 | 1 | 800 | |
| 21 | 200 | 1 | 1000 | 3 FRAMES AT MOVEMENT 200 |
| 22 | 200 | 1 | 1200 | |
| 23 | 150 | 1 | 1350 | |
| 24 | 100 | 1 | 1450 | DECELERATING |
| 25 | 50 | 1 | 1500 | |
| 26 | 0 | 0 | 1500 | |
| 27 | 0 | 0 | 1500 | |
| 28 | 0 | 0 | 1500 | 15 FRAMES ACCUMULATED |
| ⋮ | ⋮ | ⋮ | | |
| 40 | 0 | 15 | 1500 | |

FIG.27

| FRAME No. | FULL-SCREEN MOVEMENT Mv | CUMULATIVE NUMBER | TOTAL VALUE | MOVEMENT DIFFERENCE | UNIFORM VELOCITY NUMBER | |
|---|---|---|---|---|---|---|
| 1 | 0 | 0 | 0 | 0 | 0 | ⎫ |
| 2 | 0 | 0 | 0 | 0 | 0 | ⎪ |
| 3 | 0 | 0 | 0 | 0 | 0 | ⎪ |
| 4 | 0 | 0 | 0 | 0 | 0 | ⎪ 10 FRAMES |
| 5 | 0 | 0 | 0 | 0 | 0 | ⎬ ACCUMULATED |
| 6 | 0 | 0 | 0 | 0 | 0 | ⎪ |
| 7 | 0 | 0 | 0 | 0 | 0 | ⎪ |
| 8 | 0 | 0 | 0 | 0 | 0 | ⎪ |
| 9 | 0 | 0 | 0 | 0 | 0 | ⎪ |
| 10 | 0 | 10 | 0 | 0 | 10 | ⎭ |
| 11 | 50 | 1 | 50 | 50 | 0 | ⎫ |
| 12 | 50 | 1 | 100 | 0 | 0 | ⎪ |
| 13 | 50 | 1 | 150 | 0 | 0 | ⎪ 7 FRAMES AT |
| 14 | 50 | 1 | 200 | 0 | 0 | ⎬ MOVEMENT 50 |
| 15 | 50 | 1 | 250 | 0 | 0 | ⎪ |
| 16 | 50 | 1 | 300 | 0 | 0 | ⎪ |
| 17 | 50 | 1 | 350 | 0 | 7 | ⎭ |
| 18 | 100 | 1 | 450 | 50 | 1 | ⎫ ACCELERATING |
| 19 | 150 | 1 | 600 | 50 | 1 | ⎭ |
| 20 | 200 | 1 | 800 | 50 | 1 | ⎫ 3 FRAMES AT |
| 21 | 200 | 1 | 1000 | 0 | 0 | ⎬ MOVEMENT 200 |
| 22 | 200 | 1 | 1200 | 0 | 2 | ⎭ |
| 23 | 150 | 1 | 1350 | -50 | 1 | ⎫ |
| 24 | 100 | 1 | 1450 | -50 | 1 | ⎬ DECELERATING |
| 25 | 50 | 1 | 1500 | -50 | 1 | ⎭ |
| 26 | 0 | 0 | 1500 | 0 | 0 | ⎫ |
| 27 | 0 | 0 | 1500 | 0 | 0 | ⎪ |
| 28 | 0 | 0 | 1500 | 0 | 0 | ⎬ 15 FRAMES ACCUMULATED |
| ⋮ | ⋮ | ⋮ | | | | ⎪ |
| 40 | 0 | 15 | 1500 | 0 | 15 | ⎭ |

| | ACCELERATION | UNIFORM VELOCITY | DECELERATION |
|---|---|---|---|
| GRAPHICS | ▶▶ | ▶ | ▶ |
| SYMBOL | < | = | > |
| THICKNESS | ⇒ | → | ----> |
| DIRECTION | ↗ | → | ↘ |
| KANJI | 加 | 等 | 減 |
| ALPHABET | ac | eq | br |
| ARROW | ↑ | → | ↓ |

IMAGE PROCESSING APPARATUS AND IMAGE PROCESSING METHOD

BACKGROUND OF THE INVENTION

1. Field of the Invention

The present invention relates to an image processing apparatus and an image processing method and, more particularly, to an image processing apparatus and an image processing method that are configured to create an image of union as a representative image for each scene.

2. Description of the Related Art

In the past, a subject that cannot be entirely held in one screen of an imaging device (a camera) is taken as divided in two or more frames by use of pan or tilt technique. FIG. 36 shows an example in which a subject extending in the horizontal direction is taken with an imaging device (camera) by use of a pan technique.

Also, it has been practiced to process taken or created image signals to select a predetermined screen (a first screen for example) for each scene, providing the image of the selected screen as a representative image. In this case, a viewer or an editor, for example, cannot grasp the entire image of a subject that is not held in its entirety in one screen of an imaging device (a camera) taken therewith by use of a pan technique as described above.

In addition, a technique is known in which an image signal obtained by taking a subject by use of a pan technique as described above, for example, is processed to create an image of union (sum of sets) in which the images of two or more screens (frames) are linked with each other (refer to Japanese Patent Laid-open No. Hei 07-298137 and Japanese Patent Laid-open No. Hei 06-326965).

SUMMARY OF THE INVENTION

It is considered that the image of union (the union image) described above is created as a representative image (a thumbnail) for each scene. The representative image created as described above allows a viewer or an editor, for example, to grasp the entire image of a subject that is not held in its entirety in one screen of an imaging device (a camera) taken therewith by use of a pan technique as described above for example.

However, this representative image does not provide information such as how fast the subject is panned, for example. This presents a problem that a viewer or an editor of an image cannot overview not only "what is shown" but also "what is shown in what expression" in a certain scene.

Therefore, the present invention addresses the above-identified and other problems associated with related-art methods and apparatuses and solves the addressed problems by providing an image processing apparatus and an image processing method that are configured to allow the understating of not only the entire image inside a scene with a scene representative image made up of images of union but also the movement of each image inside that scene.

In carrying out the invention and according to one embodiment thereof, there is provided an image processing apparatus. This image processing apparatus has a representative image creation block configured to create, as a representative image, a union image with images of screens making up a predetermined scene linked with each other and a symbol drawing block configured, on the basis of a full-screen movement of each screen in the predetermined scene, to draw a symbol indicative of the full-screen movement on a rim of the representative image created by the representative image creation block. In this image processing apparatus, the symbol drawing block draws the symbol indicative of the full-screen movement in accordance with a display size of the representative image to be displayed on an output device.

In the embodiment mentioned above, a union image obtained by linking the images of the screens making up a predetermined scene with each other is created by the representative image creation block as a representative image. Then, on the basis of the full-screen movement of each screen in the predetermined scene, the symbol drawing block draws a symbol indicative of the full-screen movement on the rim of the representative image created by the representative image creation block. In this case, the symbol indicative of the full-screen movement is drawn in accordance with the display size of the representative image to be displayed on an output device.

As described above, in the above-mentioned embodiment, a symbol indicative of a full-screen movement is drawn on the rim of the scene representative image made up of a union image. Therefore, this novel configuration allows the user to understand not only the entire image in each scene but also the movement of each screen in one scene. In addition, a symbol indicative of a full-screen movement is drawn in accordance with the display size of a representative image in an output device. Therefore, if the display size of a representative image in an output device is relatively small, the visibility of each symbol is ensured.

The above-mentioned embodiment further has a full-screen movement computation block configured to process an image signal of the predetermined scene to compute a full-screen movement of each screen in the predetermined scene, for example. The symbol drawing block draws a symbol indicative of a full-screen movement on the rim of the representative image created by the representative image creation block on the basis of a full-screen movement of each screen in the predetermined scene computed by the full-screen movement computation block, for example.

The above-mentioned embodiments still further has a cumulative number computation block configured to compute a cumulative number of each screen on the basis of the full-screen movement of each screen in the predetermined scene, for example. In this configuration, if an accumulation is found present in a predetermined screen, the cumulative number computation block sets the cumulative number of the predetermined screen to 0 and increments a cumulative counter by 1 and, if no accumulation is found present, sets a cumulative number of an immediately preceding screen to a value of the cumulative counter, sets the cumulative number of the predetermined screen to 1 and the value of the cumulative counter to 1, and a cumulative number of a last screen to the value of the cumulative counter. On the basis of the cumulative number of each screen computed by the cumulative number computation block, the symbol drawing block draws a symbol indicative of a full-screen movement on the rim of the representative image created by the representative image creation block, for example.

In the above-mentioned embodiment, if a cumulative number of a predetermined screen is at least 1 for example, the symbol drawing block draws the symbol at a position corresponding to the predetermined screen on the rim of the representative image.

In the above-mentioned embodiment, if the cumulative number of the predetermined screen is at least 1 and not larger than N (N being an integer of at least 1) for example, the symbol drawing block draws a normal symbol as the symbol at a position corresponding to the predetermined screen on the rim of the representative image; if the cumulative number of the predetermined screen is larger than N, the symbol drawing block draws a cumulative symbol as the symbol at a position corresponding to the predetermined screen on the rim of the representative image.

In the above-mentioned embodiment, the symbol drawing block draws, as the symbol, a symbol shaped in a line extending in a direction orthogonal to a direction of the full-screen movement and sets a length of the normal symbol to be drawn with the cumulative number of the predetermined screen being not larger than N to a length corresponding to a magnitude of the full-screen movement of the predetermined screen, for example. The symbol drawing block sets a length h of the normal symbol to be drawn with the cumulative number of the predetermined screen being at least 1 and not larger than N to H*Mv/Mvmax, where H is the length of a direction orthogonal to the direction of the full-screen movement in a display area of the rim in the output device, Mvmax is a maximum movement among the full-screen movements, and Mv is a full-screen movement of each screen, for example. In this case, the length of a normal symbol to be drawn in each screen corresponds to the full-screen movement of that screen, thereby increasing the volume of the information indicated by this drawn normal symbol.

In the above-mentioned embodiment, the symbol drawing block determines a proximity of the symbols to be drawn to each other and, in accordance with a result of this determination, changes a drawing manner of the normal symbol to be drawn with the cumulative number of the predetermined screen being at least 1 and not larger than N, for example. In this case, the symbol drawing block computes the distance d between symbols closest to each other on the display area by relation W*Vmin/(S+T) where S is a length of one screen in a direction of the full-screen movement, T is a total value of the full-screen movements, Vmin is a minimum movement when no accumulation is found in the full-screen movement, and W is a length of in the direction of the full-screen movement of a display area of the representative image in the output device, thereby determining the proximity of between the symbols on the basis of the distance d obtained as above, for example. Thus, changing the manner of drawing a symbol to be drawn with the cumulative number of the predetermined screen being not larger than N in accordance with a result of the symbol proximity determination allows the user to easily understand a full-screen movement from a drawn symbol if the display size of a representative image in an output device is relatively small.

In the above-mentioned embodiment, the symbol drawing block draws the normal symbol for every predetermined number of screens such that a distance between the symbols to be drawn in the direction of the full-screen movement is in excess of a predetermined value in the display area in the output device, for example. In this case, normal symbols are thinned out before being drawn, so that, if the display size of a representative image in an output device is relatively small, the drawn normal symbols are not crowded too much to make it difficult for the user to understand full-screen movements.

In the above-mentioned embodiment, the symbol drawing block draws, as the symbol, a symbol shaped in a line segment extending in the direction orthogonal to the direction of the full-screen movement, sets the length h of the normal symbol to be drawn with the cumulative number of the predetermined screen being at least 1 and not larger than N to H*Mv/Mvmax, where H is the length of a direction orthogonal to the direction of the full-screen movement in a display area of the rim in the output device, Mvmax is a maximum movement among the full-screen movements, and Mv is a full-screen movement of each screen, and draws in dark the normal symbol to be drawn for every the predetermined number of screens and in light the normal symbol to be drawn in other screens, for example.

In the above-mentioned case, because darkly drawn normal symbols are thinned out, if the display size of a representative image in an output device is relatively small, the drawn normal symbols are not crowded too much to make it difficult for the user to understand full-screen movements, for example. Also, in this case, the length of a normal symbol drawn in each screen corresponds to the full-screen movement of that screen, thereby increasing the volume of the information indicated by this normal symbol.

In the above-mentioned embodiment, if the distance between the symbols to be drawn in the direction of the full-screen movement is less than a predetermined value on the display screen area of the output device, then the symbol drawing block draws an acceleration symbol in correspondence with an acceleration period in accordance with a full-screen movement difference between each screen from the immediately preceding screen, draws a uniform velocity symbol in correspondence with a uniform velocity period, and draws a deceleration symbol in correspondence with a deceleration period, for example.

In the above-mentioned case, for the symbols indicative of a full-screen movement, reduced symbols (an acceleration symbol, a uniform velocity symbol, and a deceleration symbol) are drawn. If the display size of a representative image in an output device is relatively small, the number of symbols to be drawn can be decreased, thereby preventing the drawn symbols from crowded too much to make it difficult for the user to understand full-screen movements. In addition, this novel configuration allows the user to easily understand the acceleration period, uniform velocity period, and deceleration period of each full-screen movement.

In the above-mentioned embodiment, a uniform velocity number computation block computing the uniform velocity number of each screen on the basis of the full-screen movement difference between each screen from the immediately preceding screen in the predetermined scene is further arranged, for example. If an accumulation is found present on a predetermined screen, the uniform velocity number computation block sets a uniform velocity number of the predetermined screen to 0 and increments a uniform velocity counter by 1; if an accumulation is found not present, the uniform velocity number computation block sets a uniform velocity number of the immediately preceding screen to a value of the uniform velocity counter, sets the uniform velocity number of the predetermined screen to 1, and sets the value of the uniform velocity counter to 1; and, if the uniform velocity number of the predetermined screen is at least 1 and not larger than M (M being an integer of at least 1), the symbol drawing block draws one of the acceleration symbol and the deceleration symbol at a position corresponding to the predetermined screen on the rim of the representative image and, if the uniform velocity number of the predetermined screen is in excess of the M, the symbol drawing block draws the uniform velocity symbol at a position corresponding to the predetermined screen on the rim of the representative image, for example.

For example, the uniform velocity number computation block determines whether there is an accumulation by determining whether a full-screen movement difference of a predetermined screen is within a threshold range or not. Also, for example, the cumulative number computation block determines whether there is an accumulation by determining whether a cumulative number of cumulative means for accumulating full-screen movement differences of each screen is within a threshold range. It should be noted that, if no accumulation is found, the cumulative means is reset to 0.

According to the embodiments of the present invention, a symbol indicative of a full-screen movement is drawn on the rim of a scene representative image made up of a union image, so that the user is able to grasp not only an entire image in a scene but also the movement of each screen in that scene.

Further, according to the embodiments of the invention, a symbol indicative of a full-screen movement is drawn in accordance with the display size in an output device of a representative image, so that, even if the display size of a representative image in the output device is relatively small, a good symbol visibility is provided.

BRIEF DESCRIPTION OF THE DRAWINGS

Other features and advantages of the invention will become apparent from the following description of embodiments with reference to the accompanying drawings in which:

FIG. 3 is a table indicative of an example of full-screen movement My of each frame and a cumulative number and total value of each frame (each screen) obtained by cumulative number computation processing when the number of frames (screens) configuring a predetermined scene is equal to 40;

FIG. 27 is a diagram illustrating one example of full-screen movement Mv of each frame, cumulative number obtained by this full-screen movement Mv of each frame, total value, movement difference, and uniform velocity number when the number of frames (screens) constituting a predetermined scene is 40;

DETAILED DESCRIPTION OF THE PREFERRED EMBODIMENTS

This invention will be described in further detail by way of embodiments thereof with reference to the accompanying drawings. The description will be made in the following order.
1. First embodiment
2. Second embodiment
3. Third embodiment
4. Fourth embodiment

1. First embodiment

Exemplary Configuration of Image Processing Apparatus

Figure 1:
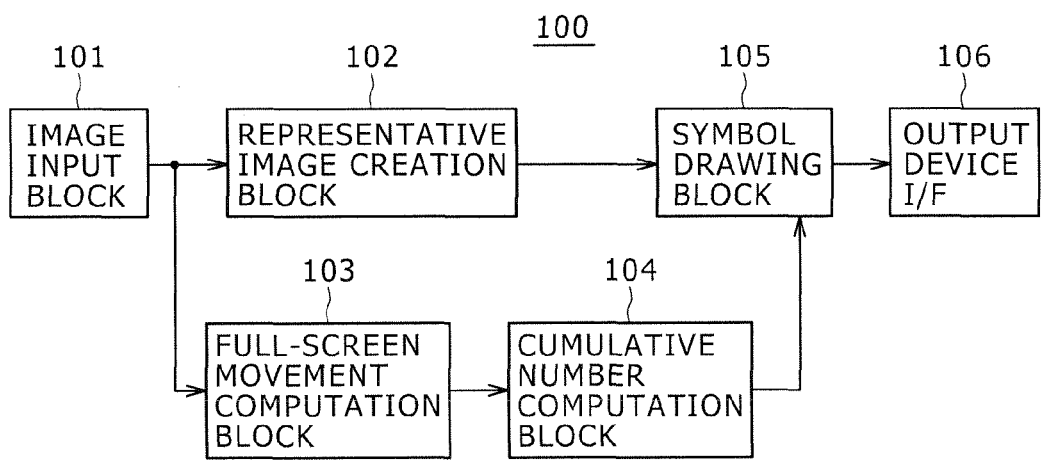
FIG. 1 is a block diagram illustrating an exemplary configuration of an image processing apparatus practiced as a first embodiment of the invention.

Now, referring to FIG. 1, there is shown an exemplary configuration of an image processing apparatus 100 that is practiced as the first embodiment of the present invention. This image processing apparatus 100 has an image input block 101, a representative image creation block 102, a full-screen movement computation block 103, a cumulative number computation block 104, a symbol drawing block 105, and an output device interface (I/F) 106.

The image input block 101 inputs an image signal to be processed into the image processing apparatus 100. This image signal to be processed, obtained by taking a subject with an imaging device (a camera, for example), is directly supplied from the imaging device or read from a predetermined recording media to be supplied. In addition, this image input block 101 detects a scene change point by processing the inputted image signal, divides the inputted signal by scene, and sequentially supplies the divided image signal to the representative image creation block 102 and the full-screen movement computation block 103.

The representative image creation block 102, the full-screen movement computation block 103, the cumulative number computation block 104, and the symbol drawing block 105 sequentially execute the processing of each scene. The following describes each of these blocks with a scene subject to processing as a predetermined scene.

The representative image creation block 102 processes the image signal of a predetermined scene, creates a union image obtained by linking the images of the respective screens (frames) that make up this predetermined scene, and provides this union image as a representative image of the predetermined scene. A technique of creating this union image is well known and therefore is not described in detail herein. For example, this union image creating technique is disclosed in Japanese Patent Laid-open No. Hei 7-298137 and Japanese Patent Laid-open No. Hei 6-326965. The representative image creation block 102 computes a full-screen movement (a motion vector) of each screen making up a predetermined scene and, on the basis of the computed full-screen movement of each screen, links the images, thereby creating a union image, for example.

The full-screen movement computation block 103 processes the image signal of a predetermined scene to compute a full-screen movement (a motion vector) of each screen within this predetermined scene. A technique of executing this computation of a full-screen movement is well known and therefore is not described in detail herein. For example, this computation technique is disclosed in Japanese Patent Laid-open No. 2001-086387, Japanese Patent Laid-open No. 2007-104516, and Japanese Patent Laid-open No. 2004-88474. For example, the full-screen movement computation block 103 computes the full-screen movement (motion vector) of each screen constituting a predetermined scene by the processing similar to the above-mentioned processing of computing the full-screen movement (motion vector) executed in the representative image creation block 102.

The cumulative number computation block 104 computes the cumulative number of each screen on the basis of the full-screen movement of each screen in the predetermined scene computed by the full-screen movement computation block 103.

Cumulative Number Computation Processing

Figure 2:
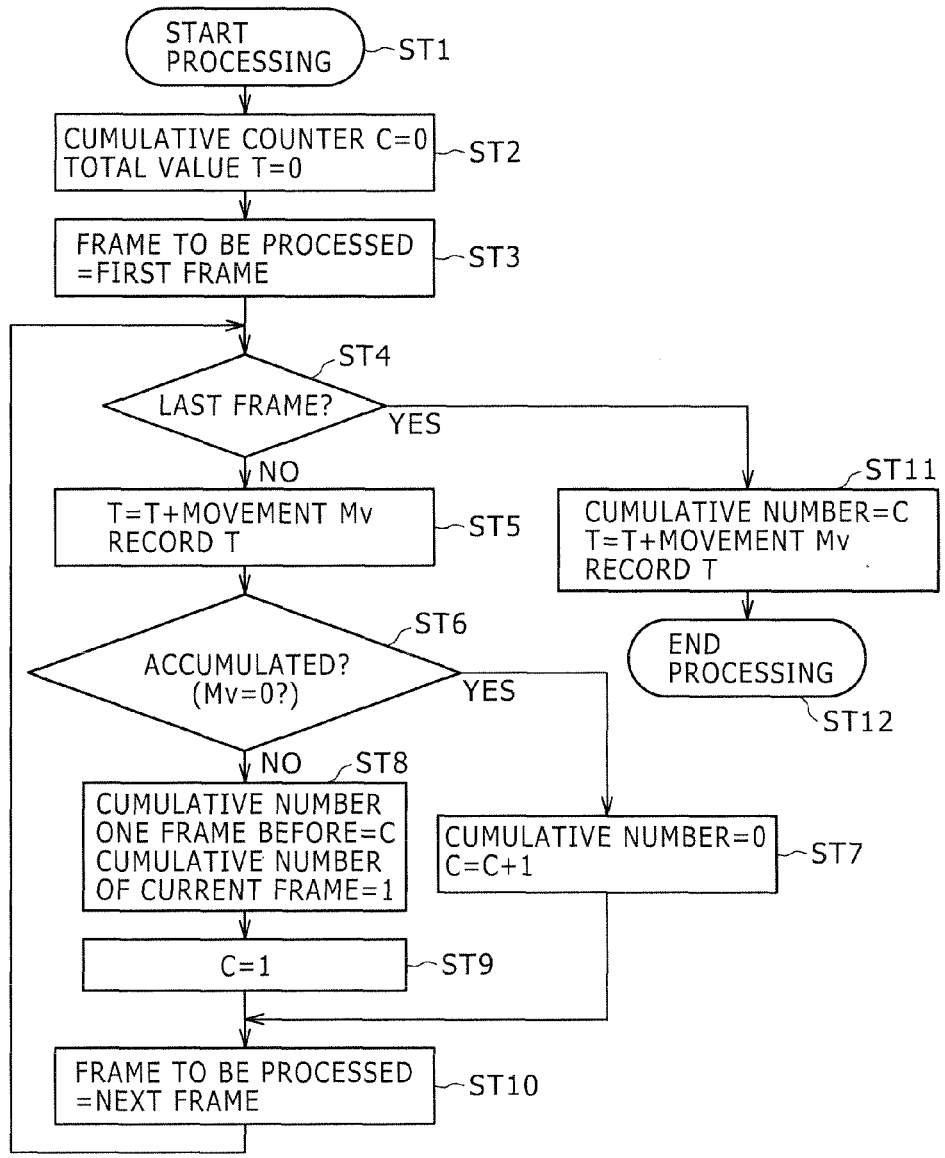
FIG. 2 is a flowchart indicative of one example of a processing procedure in a cumulative number computation block.

The flowchart shown in FIG. 2 is indicative of an exemplary processing procedure to be executed in the cumulative number computation block 104. In the step ST1, the cumulative number computation block 104 starts the processing and moves to the processing of the step ST2. In this ST2, the cumulative number computation block 104 sets the value of a cumulative counter C to 0 and the total value (cumulative movement amount) T also to 0. Next, in the step ST3, the cumulative number computation block 104 sets the processing frame (the processing screen) as the first frame (the first screen).

Next, in the step ST4, the cumulative number computation block 104 determines whether the processing frame is the last frame (the last screen) or not. If the processing frame is found not to be the last frame, then the cumulative number computation block 104 moves to the processing of the step ST5. In the step ST5, the cumulative number computation block 104 adds the full-screen movement Mv of the current frame to the total value T to obtain the total value T in the current frame, recording the obtained total value T as the total value of the current frame.

Next, the cumulative number computation block 104 determines in the step ST6 whether there is an accumulation or not. Here, the cumulative number computation block 104 determines the existence of an accumulation on the basis of whether the full-screen movement Mv of the current frame is 0 or not. To be more specific, if Mv is 0, the cumulative number computation block 104 determines that there is an accumulation; if Mv is higher than 0, the cumulative number computation block 104 determines that there is no accumulation.

If an accumulation is found, the cumulative number computation block 104 moves to the processing of the step ST7. In the step ST7, the cumulative number computation block 104 increments the value of the cumulative counter C by 1 with the cumulative number of the current frame being 0. On the other hand, if no accumulation is found, the cumulative number computation block 104 moves to the processing of the step ST8. In the step ST8, the cumulative number computation block 104 sets the cumulative number of the last one frame (one screen) to the value of the cumulative counter C and cumulative number of the current frame to 1. Then, in the step ST9, the cumulative number computation block 104 sets the value of the cumulative counter C to 1.

After the processing of the step ST7 and the processing of the step ST9, the cumulative number computation block 104 moves to the processing of the step ST10. In the step ST10, the cumulative number computation block 104 sets the processing frame to the next frame and then returns to the processing of the step ST4.

If the processing frame is the last frame in the step ST4, then the cumulative number computation block 104 moves to the processing of the step ST11. In the step ST11, the cumulative number computation block 104 sets the cumulative number of the current frame (=the last frame) to the value of the cumulative counter C. In addition, in the step ST11, the cumulative number computation block 104 adds the full-screen movement Mv of the current frame to the total value T and records the value of this total value T as the total value of the current frame (=the last frame). Then, the cumulative number computation block 104 terminates the processing in the step ST12.

Referring to FIG. 3, there is shown an exemplary chart indicative of the full-screen movement Mv of each frame and the cumulative number and the total number of each frame (each screen) obtained by the processing shown in the flowchart of FIG. 2 when the number of frames (screens) making up a predetermined scene is 40. In this example, in the frame 1 through the frame 10, the full-screen movement Mv is 0, so that it is determined that there is a continuous accumulation. With the frame 11, the full-screen movement Mv is 50, so that it is determined that there is no accumulation. Hence, the cumulative number in the frame 1 through the frame 9 is 0 and the cumulative number of the frame 10 is 10.

Also, in this example, in the frame 11 through the frame 25, the full-screen movement Mv is not 0, so that it is determined that there is no continuous accumulation. Hence, in the frame 11 through the frame 25, the accumulation number is 1. Further, in this example, the frame 26 through the frame 39, the full-screen movement Mv is 0, so that it is determined that there is a continuous accumulation. Therefore, the cumulative number in the frame 26 through the frame 39 is 0 and the cumulative number of the frame 40 that is the last frame is 15.

On the basis of the cumulative number of each screen computed by the cumulative number computation block 104, the symbol drawing block 105 draws a symbol indicative of the full-screen movement on the rim of the representative image (the union image) created by the representative image creation block 102. In addition, the symbol drawing block 105 supplies an image signal (image data) of the representative image with the symbol indicative of the full-screen movement drawn on the rim to the output device interface I/F 106.

Symbol Drawing Processing

Figure 4:
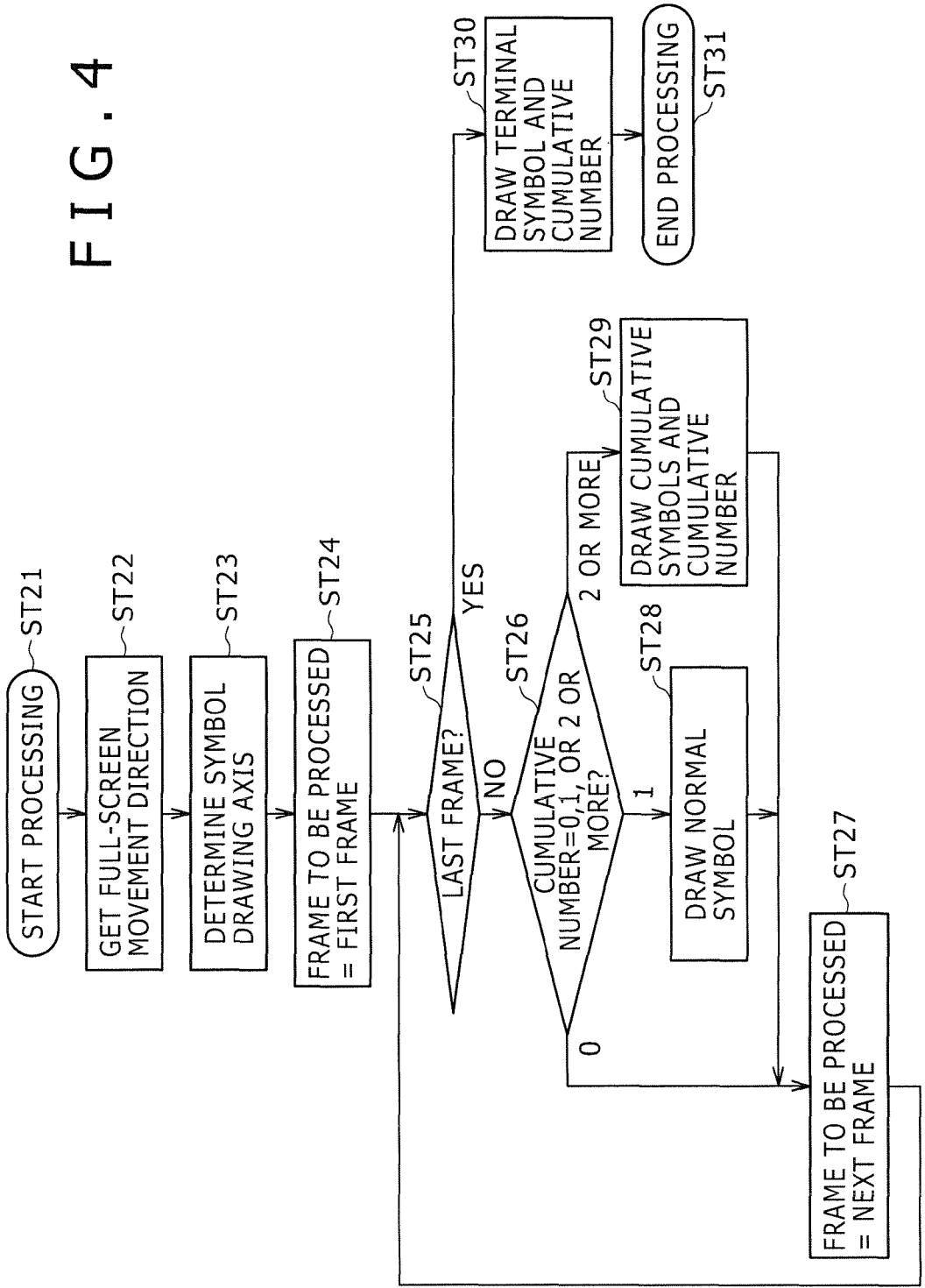
FIG. 4 is a flowchart indicative of an exemplary processing procedure to be executed in a symbol drawing block.

The flowchart shown in FIG. 4 is indicative of an exemplary processing to be executed in the symbol drawing block 105. In the step ST21, the symbol drawing block 105 starts processing and then moves to the processing of the step ST22. In the step ST22, the symbol drawing block 105 gets a full-screen movement direction. For example, the full-screen movement direction includes a horizontal direction, a vertical direction, and an oblique direction. In this case, the symbol drawing block 105 gets a full-screen movement direction on the basis of the full-screen movement (motion vector) of each screen computed by the full-screen movement computation block 103.

Next, in the step S23, the symbol drawing block 105 determines a symbol drawing axis. In this case, the symbol drawing block 105 determines a symbol drawing axis such that the symbol drawing axis corresponds to the full-screen movement direction obtained in the step ST22. For example, if the full-screen movement direction is horizontal, then the symbol drawing axis is determined in the horizontal direction. Next, the symbol drawing block 105 sets the processing frame (the processing screen) to the first frame (the first screen) in the step ST24.

In the step ST25, the symbol drawing block 105 determines whether the processing frame is the last frame (the last screen) or not. If the processing frame is found to be not the last frame, then the symbol drawing block 105 moves to the processing of the step ST26. In the step ST26, the symbol drawing block 105 determines whether the cumulative number is 0, 1 or 2 or more.

If the cumulative number is 0, then the symbol drawing block 105 sets the processing frame to the next frame in the step ST27 and then returns to the processing of the step ST25.

If the cumulative number is 1, then the symbol drawing block 105 moves to the processing of the step ST28. In the step ST28, the symbol drawing block 105 draws a normal symbol as a symbol at the position corresponding to the current frame (the current screen) of the representative image (the union image). Next, after the processing of the step ST28, the symbol drawing block 105 sets the processing frame to the next frame in the step ST27, returning to the processing of the step ST25.

If the cumulative number is 2 or more, then the symbol drawing block 105 moves to the processing of the step ST29. In the step ST29, the symbol drawing block 105 draws a cumulative symbol as a symbol at the position corresponding to the current frame (the current screen) of the representative image (the union image). This cumulative symbol can be distinguished from the above-mentioned normal symbol by shape, size, pattern, or color, for example.

In the step ST29, the symbol drawing block 105 further draws the cumulative number at the position corresponding to the drawing position of the cumulative symbol. Then, after the processing of the step ST29, the symbol drawing block 105 sets the processing frame to the next frame in the step ST27 and returns to the processing of the step ST25.

If the processing frame is found to be the last frame in the step ST25, the symbol drawing block 105 moves to the processing of the step ST30. In the step ST30, the symbol drawing block 105 draws a terminal symbol as a symbol at the position corresponding to the current frame (the last frame) of the representative image (the union image). This terminal symbol can be distinguished from the above-mentioned ordinary symbol and cumulative symbol by shape, size, pattern, or color, or the like.

Further, in the step ST30, the symbol drawing block 105 draws the cumulative number at the position corresponding to the drawing position of the terminal symbol. Then, after the processing of the step ST30, the symbol drawing block 105 ends the processing in the step ST31.

Figure 5:
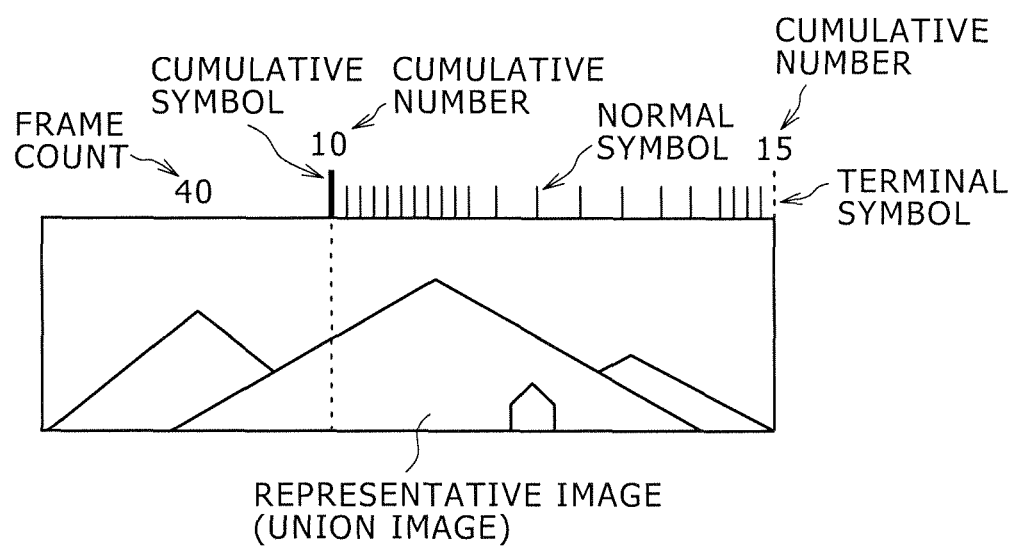
FIG. 5 is a diagram illustrating a drawing example of each symbol and cumulative number when the number of frames (screens) configuring a predetermined scene is equal to 40.

Referring to FIG. 5, there is shown an exemplary drawing of symbols and cumulative numbers when the cumulative numbers and the total number of the frames (the screens) are shown in FIG. 3 with the number of frames (screens) making up a predetermined scene being 40. It should be noted that, in this drawing example, each of the symbols is indicated by a line segment. In this example, the cumulative number is 0 in the frame 1 through the frame 9, so that symbol drawing is not executed. At the frame 10, the cumulative number is 10, a cumulative symbol is drawn at the position (the upper right corner of this frame) corresponding to this frame and the cumulative number "10" is drawing at the position corresponding to the cumulative symbol.

The cumulative number in the frame 11 through the frame 25 is 1, so that a normal symbol is drawn at the position corresponding to that frame. The cumulative number is 0 in the frame 26 through the frame 39, so that symbol drawing is not executed. With the last frame 40, a terminal symbol is drawn and the cumulative number "15" is drawn at the position corresponding to the terminal symbol.

Figure 6A:
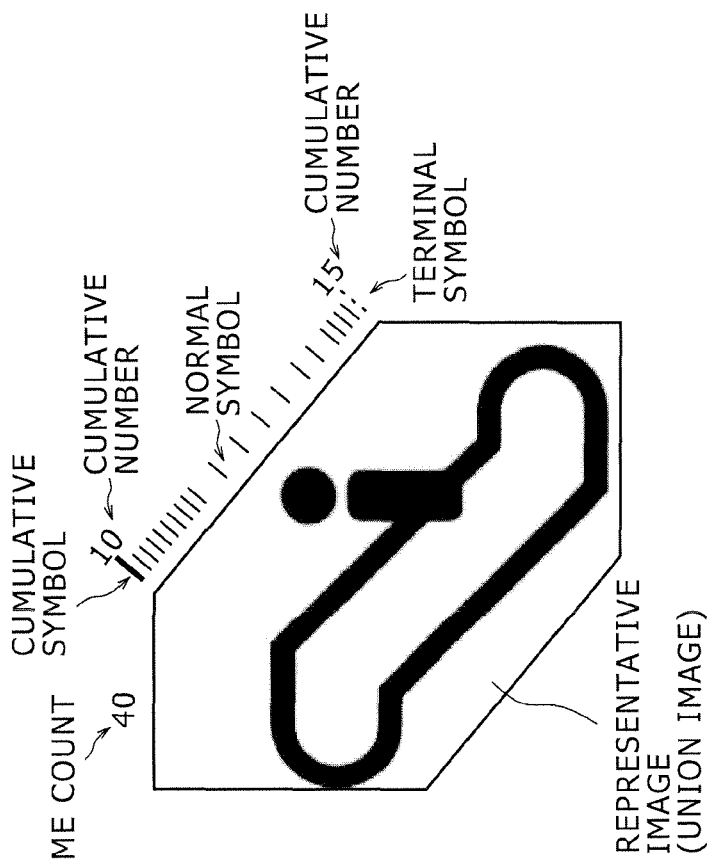
FIGS. 6A and 6B are diagrams illustrating another drawing example of each symbol and cumulative number when the number of frames (screens) configuring a predetermined scene is equal to 40.
Figure 6B:
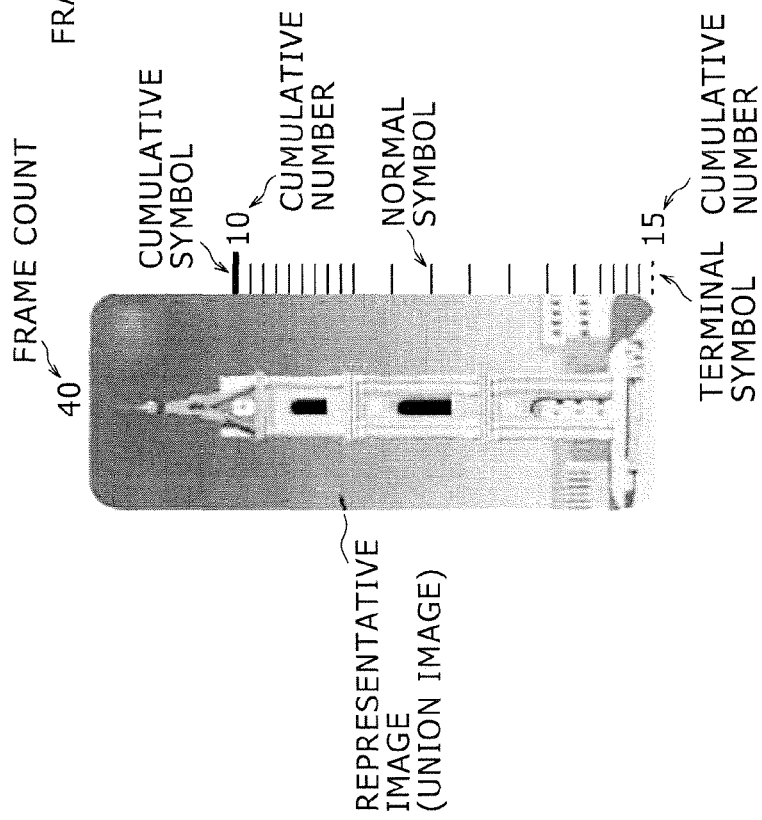

It should be noted that FIG. 5 shows an exemplary drawing with the full-screen movement direction being horizontal; if the full-screen movement direction is other than horizontal, the drawing is executed in the same manner. For example, FIG. 6A shows an exemplary drawing with the full-screen movement direction being vertical and FIG. 6B shows an exemplary drawing with the full-screen movement direction being oblique.

The output device interface I/F 106 supplies the image data supplied from the symbol drawing block 105, namely, the image signal (the image data) of the representative image (the union image) drawn with a symbol indicative of the full-screen movement on the rim, to an output device, such as an image display apparatus or a recording device. For example, with an image display apparatus, the representative image (the union image) drawn with a symbol indicative of the full-screen movement on the rim is displayed. With a recording apparatus, the image signal of the representative image of the symbol drawings of each scene is recorded to a recording media as related with each scene of the image signal inputted in the image input block 101.

Exemplary Operation of Image Processing Apparatus

The following describes an exemplary operation of the image processing apparatus 100 shown in FIG. 1. An image signal to be processed is inputted in the image input block 101. This image signal to be processed is obtained by taking a subject with an imaging device (a camera) for example and supplied directly from the imaging device or from a predetermined recording media.

In the image input block 101, the inputted image signal is processed to detect a scene change point and the inputted image signal is divided for each scene. Then, in the image input block 101, the image signal for each scene is sequentially supplied to the representative image creation block 102 and the full-screen movement computation block 103.

In the representative image creation block 102, the full-screen movement computation block 103, the cumulative number computation block 104, and the symbol drawing block 105, each scene is sequentially set to a scene to be processed (a predetermined scene) and processed. To be more specific, in the representative image creation block 102, the image signal of a predetermined scene is processed, a union image obtained by linking the images of the respective screens (the frames) making up this predetermined scene is created, and the created union image is set to the representative image of the predetermined scene.

In the full-screen movement computation block 103, the image signal of the predetermined scene is processed and a full-screen movement (a motion vector) of each screen in this predetermined scene is computed. The full-screen movement of each screen in the predetermined scene thus computed is supplied to the cumulative number computation block 104. In the cumulative number computation block 104, a cumulative number and a total value of each screen in the predetermined scene are computed on the basis of the full-screen movement of each screen in the predetermined scene (refer to FIG. 2).

The cumulative number and the total value of each screen in the predetermined scene computed in the cumulative number computation block 104 are supplied to the symbol drawing block 105. The image signal (the image data) of the representative image (the union image) created in the representative image creation block 102 is also supplied to this symbol drawing block 105. In this symbol drawing block 105, a symbol indicative of the full-screen movement is drawn on the rim of the representative image (the union image) on the basis of the cumulative number of each screen in the predetermined scene (refer to FIG. 4).

In this case, in a screen with the cumulative number being 1, a normal symbol is drawn as a symbol at the position corresponding to that screen of the representative image (the union image). In a screen with the cumulative number is 2 or more, a cumulative symbol is drawn as a symbol at the position corresponding to that screen of the representative image (the union image). Further, in a terminal screen, a terminal symbol is drawn as a symbol at the position corresponding to that screen and the cumulative number is also drawn accordingly.

In the symbol drawing block 105, an image signal (image data) of the representative image (the union image) with a symbol indicative of total-screen movement drawn on the rim is obtained for each scene. The obtained image signal (image data) is supplied to the output device interface I/F 106. In the output device interface I/F 106, the image signal supplied from the symbol drawing block 105, namely, the image signal (the image data) of the representative image with the symbol indicative of the full-screen movement drawn on the rim, is supplied to an output device, such as an image display apparatus or a recording apparatus.

Consequently, in the image display apparatus for example, the representative image (the union image) with the symbol indicative of the full-screen movement drawn on the rim is displayed. In the recording apparatus for example, the image signal of the symbol drawn representative image of each scene is recorded to a recording media as related with each scene of the image signal inputted in the image input block 101.

As described above, in the image processing apparatus 100 shown in FIG. 1, the image signal of a predetermined scene is processed by the representative image creation block 102 and a union image with the images of the respective screens making up this predetermined scene interconnected is created as a representative image. In addition, the image signal of the predetermined scene is processed by the full-screen movement computation block 103 and the full-screen movement of each screen in this predetermined scene is computed. Further, on the basis of the computed full-screen movement of each screen in the predetermined scene, the cumulative number of each screen in the predetermined scene is computed by the cumulative number computation block 104.

Then, the symbols (normal symbol, cumulative symbol, and terminal symbol) indicative of the full-screen movement are drawn by the symbol drawing block 105 on the rim of the representative image (the union image) created by the representative image creation block 102 on the basis of the computed cumulative number of each screen in the predetermined scene. Therefore, the above-mentioned configuration allows not only the understanding of the entire image in the scene but also the understanding of each screen in the scene. Namely, the above-mentioned configuration allows the user not only to see "what is displayed" in the scene but also to overview "what is displayed how."

The related-art thumbnail schemes provide only the expression capability that allows the understanding of what is displayed. It should be noted that, in the case of an image well worked out, a temporal context indicative of "what image expression a particular object is displayed in" is also important information for audience and users who want to use subject images as materials of work. For example, take two images obtained by panning a same landscape scene. The applications of these images will differ greatly between the image taken continuously without the accumulation of one frame and the image taken by stopping the camera for four seconds at the beginning and the end.

As described above, symbols (normal symbol, cumulative symbol, and terminal symbol) indicative of a full-screen movement are drawn on the rim of the representative image (the union image) for each scene. This facilitates the user to easily access an image that the user wants to see or use as a material. Consequently, the above-mentioned configuration allows not only the browsing of images and the using of images as a representative image at the time of authoring but also the using of images as a representative image as a result of image searching.

In addition, in constructing a relationship between two or more images, the above-mentioned configuration allows the assignment of the relationship based on new metadata of the contents of "how images are expressed." This also leads to the contribution to an image search algorithm. Thus, the visualization to the user of a new index to the relationship between two or more images is also advantageous for a search application for searching for target images.

It should be noted that, in the image processing apparatus 100 shown in FIG. 1, the symbol drawing block 105 draws a normal symbol in a screen with the cumulative number being 1 and a cumulative symbol in a screen with the cumulative number being 2 or more (refer to FIG. 4). Generally, however, a normal symbol may be drawn in a screen with the cumulative number being 1 to N (N being an integer equal to or higher than 1) and a cumulative symbol may be drawn in a screen with the cumulative number being more than N. In this case, the user may set the value of N as desired through a user operation block, not shown.

Further, in the image processing apparatus 100 shown in FIG. 1, the symbol drawing block 105 is configured to draw symbols (normal symbol, cumulative symbol, and terminal symbol) indicative of a full-screen movement on the basis of the cumulative number of each screen in the predetermined scene, the cumulative number being computed by the cumulative number computation block 104. However, a configuration is also possible that a normal symbol is drawn at the position corresponding to each screen in order to indicate the movement of each screen in the scene, for example. In this case, the symbol drawing block 105 can execute symbol drawing by directly using the full-screen movement of each screen in the predetermined scene computed by the full-screen movement computation block 103.

Also, in the image processing apparatus 100 shown in FIG. 1, the symbol drawing block 105 draws a cumulative number corresponding to each of the drawing positions of a cumulative symbol and a terminal symbol. However, this drawing of cumulative numbers is not always necessary.

Another Example of Cumulative Number Computation Processing

In the above description, cumulative number computation block 104 is configured to compute a cumulative number for each screen on the basis of the full-screen movement of each screen in a predetermined scene computed by the full-screen movement computation block 103. However, if the information about the full-screen movement for each screen is prepared as metadata, the cumulative number computation block 104 can use this information to compute the cumulative number for each screen. In this case, the information about the full-screen movement for each screen is supplied from the image input block 101 to the cumulative number computation block 104, thereby eliminating the necessity of the full-screen movement computation block 103, for example.

In the above-mentioned embodiment, the cumulative number computation block 104 determines the presence of accumulation by determining whether the full-screen movement Mv of the current frame is 0 or not. However, an image may have been taken without using a tripod or by use of a tripod of low quality or down-converted or up-converted. In such a case, "accumulation is present" may be regarded from the intention of the photographer or the feeling of audience. However, a value slightly different from 0 may be computed for a full-screen movement, thereby eventually determining that there is no accumulation.

Figure 7:
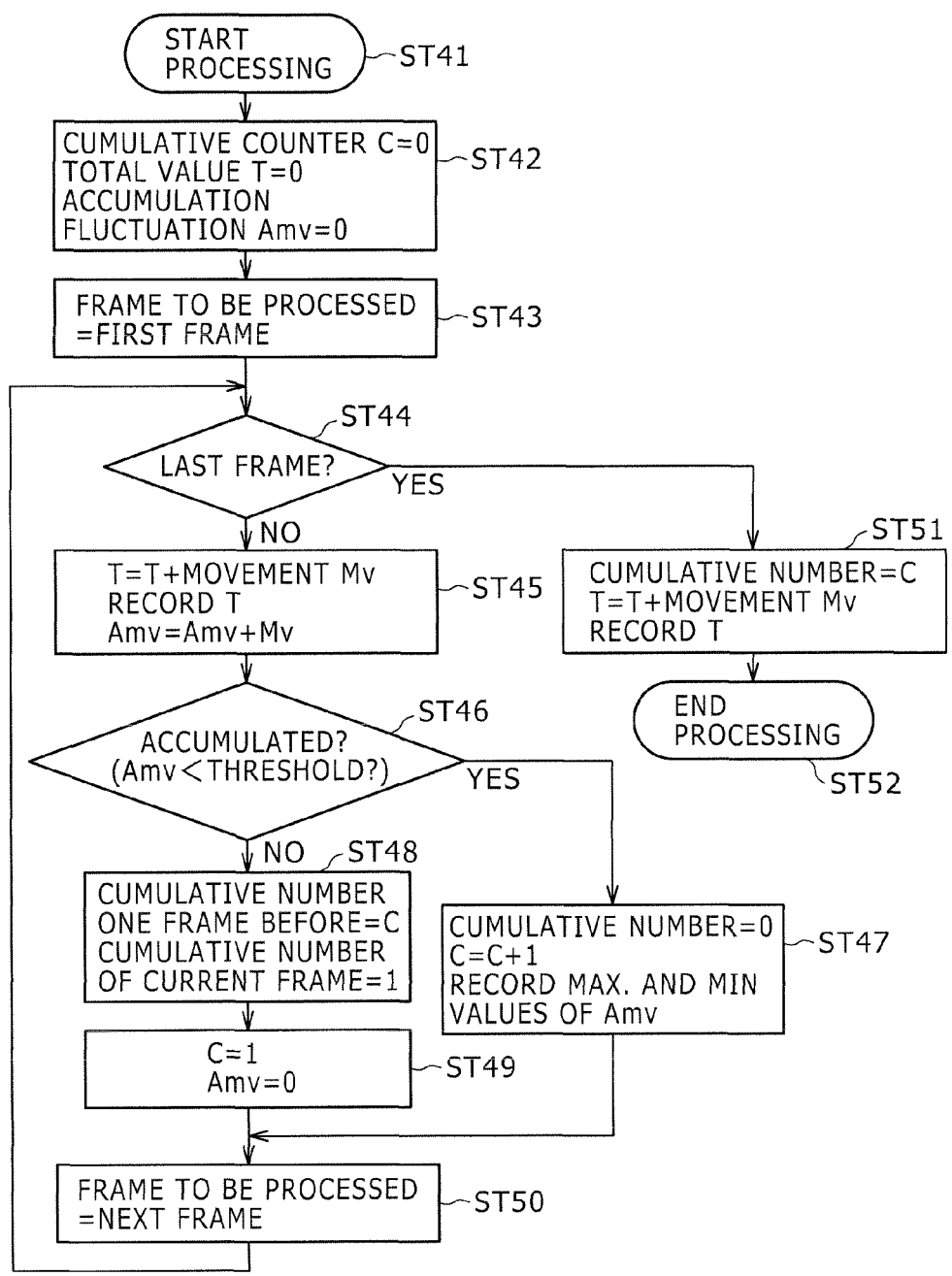
FIG. 7 is a flowchart indicative of an exemplary processing procedure to be executed in the cumulative number computation block in the determination of the presence an accumulation depending on whether accumulation deflection Amv is within a threshold or not.

In order to overcome this problem, the presence of accumulation may be determined by defining a total value of the full-screen movements Mv to be an accumulation deflection Amv and determining whether this accumulation deflection Amv is within a threshold value. This configuration allow the determination that a screen which may be regarded as accumulated from the feeling of audience is surely accumulated. The flowchart shown in FIG. 7 is indicative of an exemplary processing procedure of the cumulative number computation block 104 in this case.

In the step ST41, the cumulative number computation block 104 starts processing and then moves to the processing of the step ST42. In the step ST42, the cumulative number computation block 104 sets the value of the cumulative counter C to 0, the total value (cumulative movement amount) T of the full-screen movement Mv to 0, and the accumulation deflection Amv to 0. Then, in the step ST43, the cumulative number computation block 104 sets the processing frame (the processing screen) to the first frame (the first screen).

Next, in the step ST44, the cumulative number computation block 104 determines whether the processing frame is the last frame (the last screen) or not. If the processing frame is found not to be the last frame, the cumulative number computation block 104 moves to the processing step ST45. In the step ST45, the cumulative number computation block 104 adds the full-screen movement Mv of the current frame to the total value T to obtain the total value T in the current frame, recording the obtained total value T as the total value of the current frame. Also, in the step ST45, the cumulative number computation block 104 adds the full-screen movement Mv to the accumulation deflection Amv to update the accumulation deflection Amv.

Next, in the step S46, the cumulative number computation block 104 determines whether there is an accumulation or not. Here, the cumulative number computation block 104 determines whether there is an accumulation or not by determining whether the accumulation deflection Amv is within the threshold or not. Namely, the cumulative number computation block 104 determines that there is an accumulation if Amv is found within the threshold; if Amv is found over the threshold, the cumulative number computation block 104 determines that there is no accumulation.

If an accumulation is found, the cumulative number computation block 104 moves to the processing of the step ST47. In the step ST47, the cumulative number computation block 104 increments the value of the cumulative counter C by 1 with the cumulative number of the current frame being 0. Also, in the step ST47, the cumulative number computation block 104 records the maxim and minimum values of the accumulation deflection Amv. This recorded information provides information (metadata) indicative of how much the accumulation deflection Amv was when no accumulation was found. For example, on the basis of this information, it is possible to adaptively change the threshold.

On the other hand, if no accumulation is found, the cumulative number computation block 104 moves the processing of the step S48. In the step S48, the cumulative number computation block 104 sets the cumulative number of the frame (one screen) immediately before to the value of cumulative counter C and the cumulative number of the current frame to 1. Then, in the step ST49, the cumulative number computation block 104 sets the value of the cumulative counter C to 1 and resets the accumulation deflection Amv to 0.

After the processing of the step ST47 and the processing of the step ST49, the cumulative number computation block 104 moves to the processing of the step ST50. In the step ST50, the cumulative number computation block 104 sets the processing frame to the next frame and then returns to the processing of the step ST44.

If the processing frame is the last frame in the step ST44, the cumulative number computation block 104 moves to the processing of the step ST51. In the step ST51, the cumulative number computation block 104 sets the cumulative number of the current frame (=the last frame) to the value of cumulative counter C. Further, in the step ST51, the cumulative number computation block 104 adds the full-screen movement Mv of the current frame to the total value T to obtain the total value T in the current frame, recording the obtained total value T. Then, the cumulative number computation block 104 ends the processing in the step ST52.

It should be noted that, in the configuration described above, the presence of accumulation is determined by determining whether the accumulation deflection Amv that is a total value of the full-screen movements Mv is within a threshold. Further, it is also possible to determine whether, in each screen (each frame), there is an accumulation by determining whether the full-screen movement Mv of that screen is within a threshold or not. In this case too, if an accumulation is found, the maximum and minimum values of the full-screen movement Mv are recorded. This recorded information provides behavior information (metadata) of the full-screen movement Mv indicative of the degree of the full-screen movement Mv in the case where no accumulation is found. For example, the threshold may be adaptively changed on the basis of this information.

Another Example of Symbol Drawing Processing

In the above description, an example is used in which the full-screen movement is in one direction. However, it is possible that the full-screen movements is made in two or more directions. For example, it is possible that each screen moves in the forward direction and then in the reverse direction as with the case where pan is made to the right and then back to the left. In such a case, the symbol drawing position corresponding to each screen with the full-screen movement direction being the forward direction (the first direction) and the symbol drawing position corresponding to each screen in the reverse direction (the second direction) are shifted in the directions orthogonal to the forward direction and the reverse direction, for example. Consequently, the symbols indicative of the full-screen movements in these directions do not overlap each other, thereby enhancing the visibility of the symbols. In addition, in this case, because a terminal symbol alone may make it difficult to understand the movement of an image, a symbol (a cumulative ID) indicative of the sequence of accumulation is added to a cumulative symbol.

Figure 8:
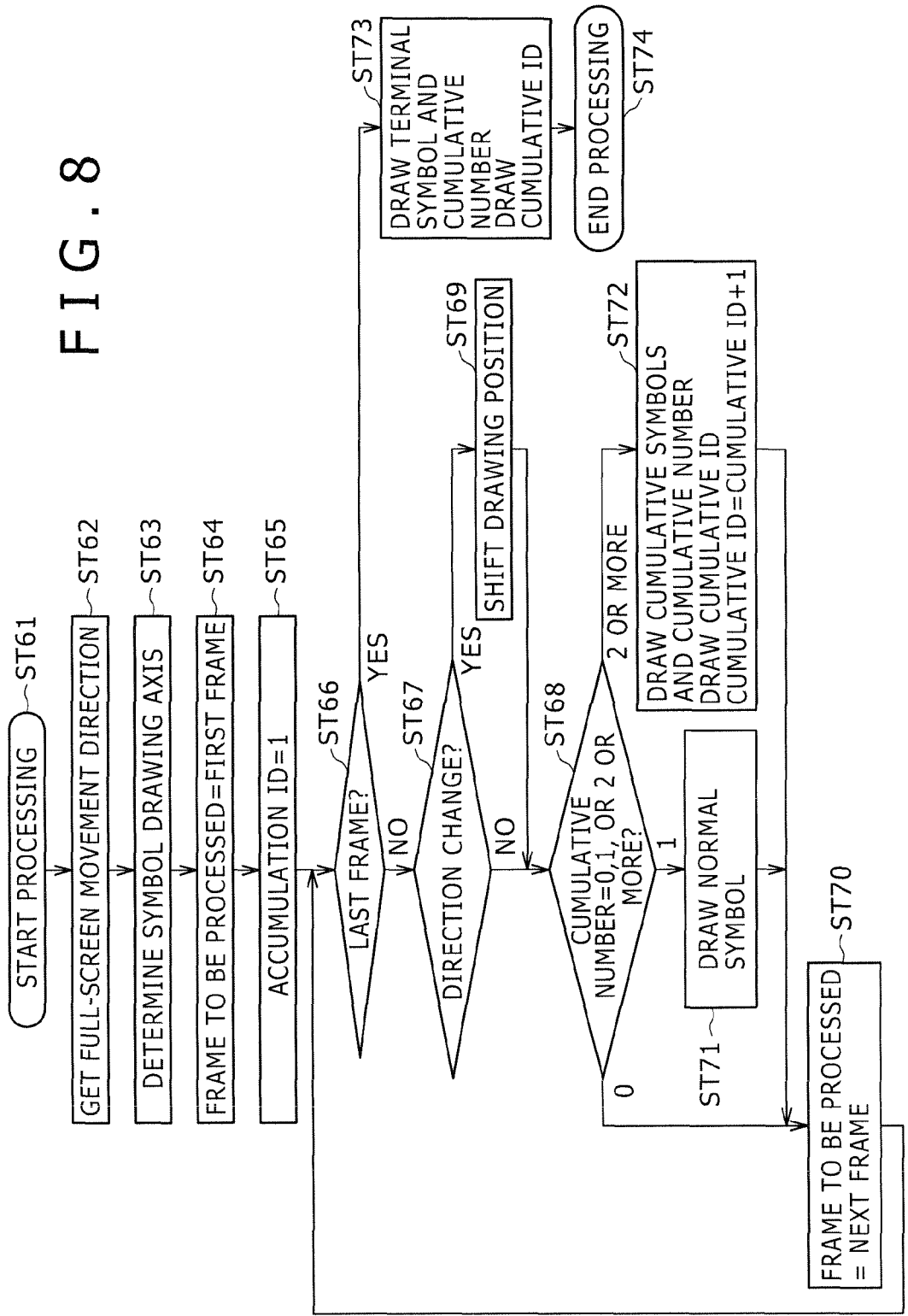
FIG. 8 is a flowchart indicative of an exemplary processing procedure to be executed in the symbol drawing block when a symbol (cumulative ID) indicative of a cumulative sequence is added to cumulative symbols.

The flowchart shown in FIG. 8 is indicative of an exemplary processing procedure to be executed by the symbol drawing block 105 in the above-mentioned case. In the step ST61, the symbol drawing block 105 starts the processing and then moves to the processing of the step ST62. In the step ST62, the symbol drawing block 105 gets a free-screen movement direction. For example, the movement direction is horizontal, vertical, or oblique. In this case, the symbol drawing block 105 gets the full-screen movement direction on the basis of the full-screen movement (motion vector) of each screen computed by the full-screen movement computation block 103, for example.

Next, the symbol drawing block 105 determines a symbol drawing axis in the step ST63. In this case, the symbol drawing block 105 determines a symbol drawing axis such that the symbol drawing axis corresponds to the full-screen movement direction obtained in the step ST62. For example, if the full-screen movement direction is horizontal, a symbol drawing axis is set in the horizontal direction. Then, in the step ST64, the symbol drawing block 105 sets the processing frame (the processing screen) to the first frame (the first screen) and, in the step ST65, sets the cumulative ID to 1.

Next, the symbol drawing block 105 determines in the step ST66 whether the processing frame is the last frame (the last screen) or not. If the processing frame is found not to be the last frame, the symbol drawing block 105 determines in the step ST67 whether the full-screen movement direction has changed from the forward direction to the reverse direction. If the direction change is not found, the symbol drawing block 105 moves to the processing of the step ST68. On the other hand, if the direction change is found, the symbol drawing block 105 shifts the drawing position to the direction that is orthogonal to the above-mentioned forward and reverse directions in the step ST69 and then moves to the processing of the step ST68.

In the step ST68, the symbol drawing block 105 determines whether the cumulative number is 0, 1, or 2 or more. If the cumulative number is found to be 0, then the symbol drawing block 105 sets the processing frame to the next frame in the step ST70 and then returns to the processing of the step ST66. If the cumulative number is 1, then the symbol drawing block 105 moves to the processing of the step ST71. In the step ST71, the symbol drawing block 105 draws a normal symbol as a symbol at the position corresponding to the current frame (processing screen) of the representative image (the union image). Next, after the processing of the step ST71, the symbol drawing block 105 sets the processing frame to the next frame in the step ST70 and then returns to the processing of the step ST66.

Further, if the cumulative number is found to be equal to or higher than 2, the symbol drawing block 105 moves to the processing of the step ST72. In the step ST72, the symbol drawing block 105 draws a cumulative symbol as a symbol at the position corresponding to the current frame (processing screen) of the representative image (the union image). This cumulative symbol can be distinguished from the above-mentioned normal symbol by shape, size, pattern, or color.

Also, in the step ST72, the symbol drawing block 105 draws a cumulative number at the position corresponding to the position at which the cumulative symbol is drawn. Further, the symbol drawing block 105 draws a cumulative ID as a symbol indicative of the sequence of accumulation at the position corresponding to the position at which this cumulative symbol is drawn and, at the same time, increments the cumulative ID by 1. After the processing of the step ST72, the symbol drawing block 105 sets the processing frame to the next frame in the step ST70 and then returns to the processing of the step ST66.

If the processing frame is found to the last frame in the step ST66, then the symbol drawing block 105 moves to the processing of the step ST73. In the step ST73, the symbol drawing block 105 draws a terminal symbol as a symbol at the position corresponding to the current frame (=the last frame) of the representative image (the union image). This terminal symbol can be distinguished from the above-mentioned normal symbol and cumulative symbol by shape, size, pattern, or color.

Further, in the step ST73, the symbol drawing block 105 draws a cumulative number at the position corresponding to the position at which the terminal symbol is drawn. In addition, the symbol drawing block 105 draws a cumulative ID as a symbol indicative of the sequence of accumulation at the position corresponding to the position at which this terminal symbol is drawn. Then, after the processing of the step ST73, the symbol drawing block 105 ends the processing in the step ST74.

Figure 9:
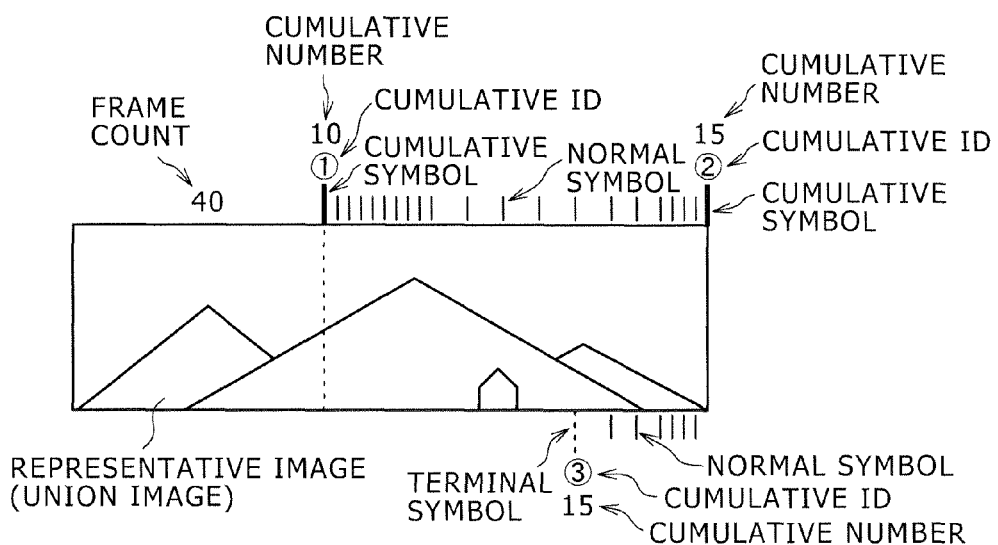
FIG. 9 is a diagram illustrating an example of drawing each symbol, a cumulative number, and a cumulative ID when the direction of full-screen movement is changed from forward direction to reverse direction.

Referring to FIG. 9, there is shown an exemplary drawing of each symbol, cumulative number, and cumulative ID. It should be noted that each symbol is expressed by a line segment in this exemplary drawing. In this example, each cumulative ID is expressed by a circled number. The drawing position at which a cumulative ID is drawn as circled 1 is the first cumulative position. It is known that 10 screens (frames) are accumulated at this position. The drawing position at which a cumulative ID is drawn as circled 2 is the second cumulative position. It is seen that 15 screens (frames) are accumulated at this position.

Then, the full-screen movement direction is changed from forward to reverse. Hence, the symbol drawing position is shifted. In this example, the symbol drawing position after the change of the full-screen movement direction to the reverse direction is the opposite side. The drawing position of the terminal symbol at which circled 3 is drawn as the cumulative ID is the position of the last screen (the last frame). It is seen that 15 screens (frames) are accumulated at this position.

Figure 10A:
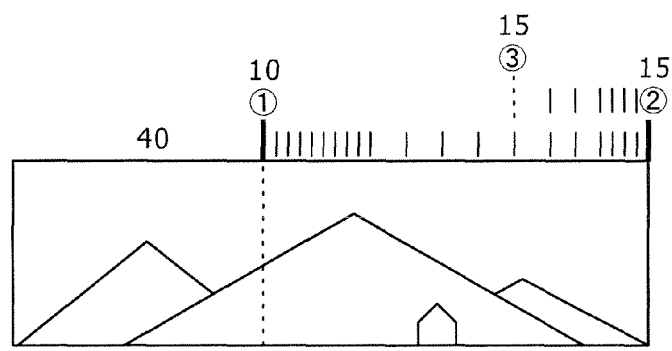
FIGS. 10A and 10B show other examples of drawing symbols, cumulative numbers, and cumulative IDs when the direction of full-screen movement is changed from forward direction to reverse direction.
Figure 10B:
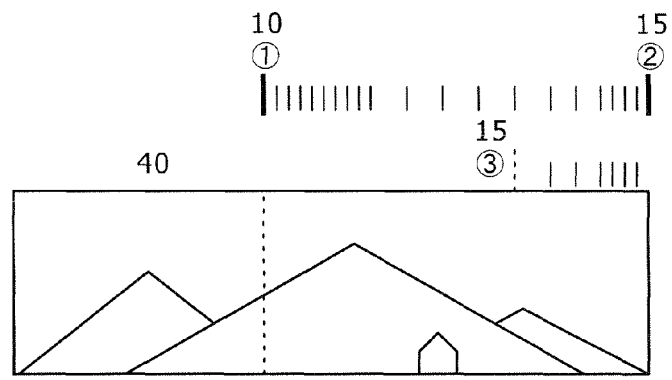

Referring to FIG. 10A, there is shown another exemplary drawing of each symbol, cumulative number, and cumulative ID. This exemplary drawing is basically the same as the exemplary drawing shown in FIG. 9. In this example, the symbol drawing position after the change of the full-screen movement direction from the reverse direction is the position vertically shifted on the same side. FIG. 10B shows another exemplary drawing of each symbol, cumulative number, and cumulative ID. This exemplary drawing is also basically the same as the exemplary drawing shown in FIG. 9. In this example, the symbol drawing position after the change of the full-screen direction to the reverse direction is also the position vertically shifted on the same side. However, the difference from the exemplary drawing shown in FIG. 10A lies in that the symbol drawing position in the forward direction and the symbol drawing position in the reverse direction are interchanged.

It should be noted that, in the exemplary drawings shown in FIG. 9 and FIG. 10, each cumulative ID is indicated by a circled number. However, in addition to the use of circled numbers, it is also practicable to use self-apparent characters, such as A, B, C, . . . , or equivalent Japanese characters or symbols, such as an upside down triangle, that explicitly indicate the moving direction.

Figure 11:
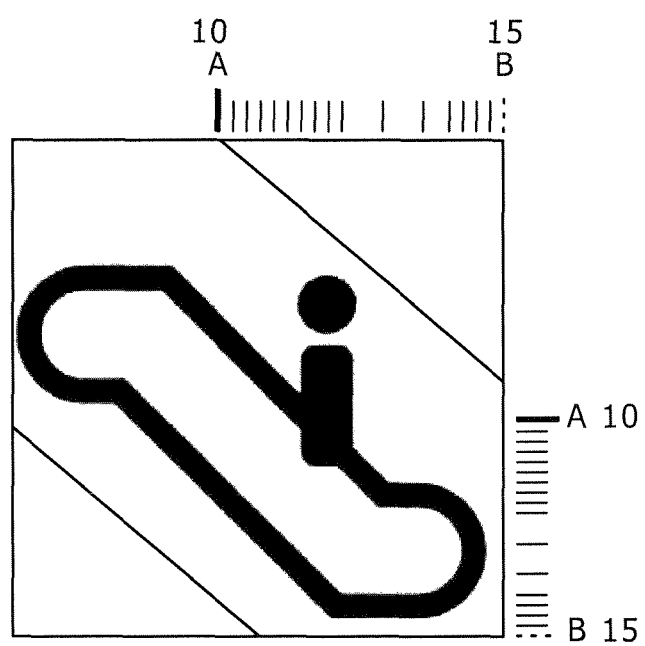
FIG. 11 is a diagram illustrating an exemplary drawing in which a full-screen movement is vector-dissolved into horizontal and vertical directions and a symbol is drawn in each vector direction.

In the above-mentioned example, the symbol drawing axis is in one direction. However, it is also practicable to vector-resolving the full-screen movement into the horizontal direction and the vertical direction from the beginning to draw a symbol in each vector direction. FIG. 11 shows an exemplary drawing executed by this method. In this exemplary drawing, the full-screen movement direction is the oblique straight line from the upper left direction to the lower right direction. This method is also application to the case in which the direction changes halfway upon changing of the moving speed ratio between the horizontal direction and the vertical direction.

Figure 12A:
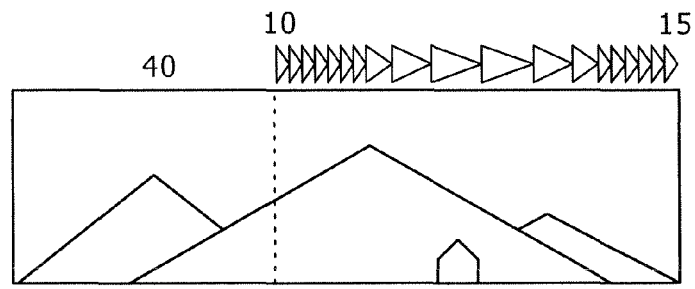
FIGS. 12A, 12B, and 12C are diagrams illustrating examples other than line segments of a symbol indicative of a full-screen movement.
Figure 12B:
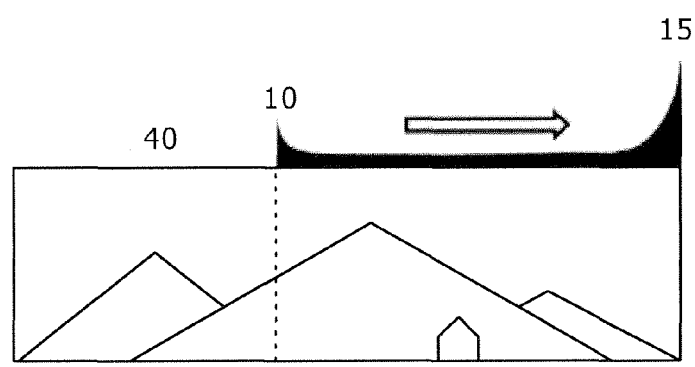
Figure 12C:
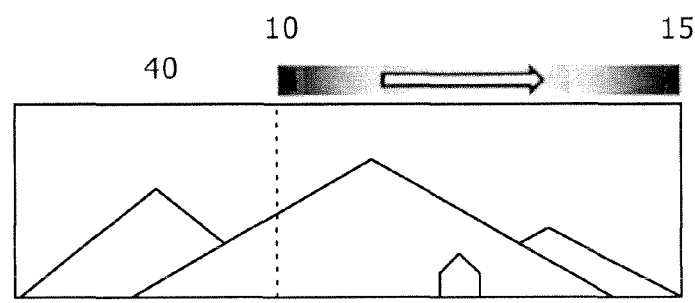

Also, in the above-mentioned example, as shown in FIGS. 5, 6A, 6B, 9 to 11, the symbol indicative of the full-screen movement is a line segment. However, in addition to the line-segment indication, it is also practicable to use numbers, symbols as shown in FIG. 12A, graphic shapes as shown in FIG. 12B, gradations as shown in FIG. 12C, or color.

Another Example of Symbol Drawing Processing

In the above-mentioned example, each normal symbol drawn by the symbol drawing block 105 is indicated by a line segment of the same length. Here, it is considered to make the length of each normal symbol a length that corresponds to the full-screen movement of each screen. In this case, the length h of a normal symbol drawn on a predetermined screen is H*Mv/Mvmax, where H is the length in the direction orthogonal to the direction (the full-screen movement direction) of the full-screen movement of the display area on the rim of an output device, Mvmax is the maximum movement in the full-screen movements, and Mv is the full-screen movement of each screen.

Figure 13:
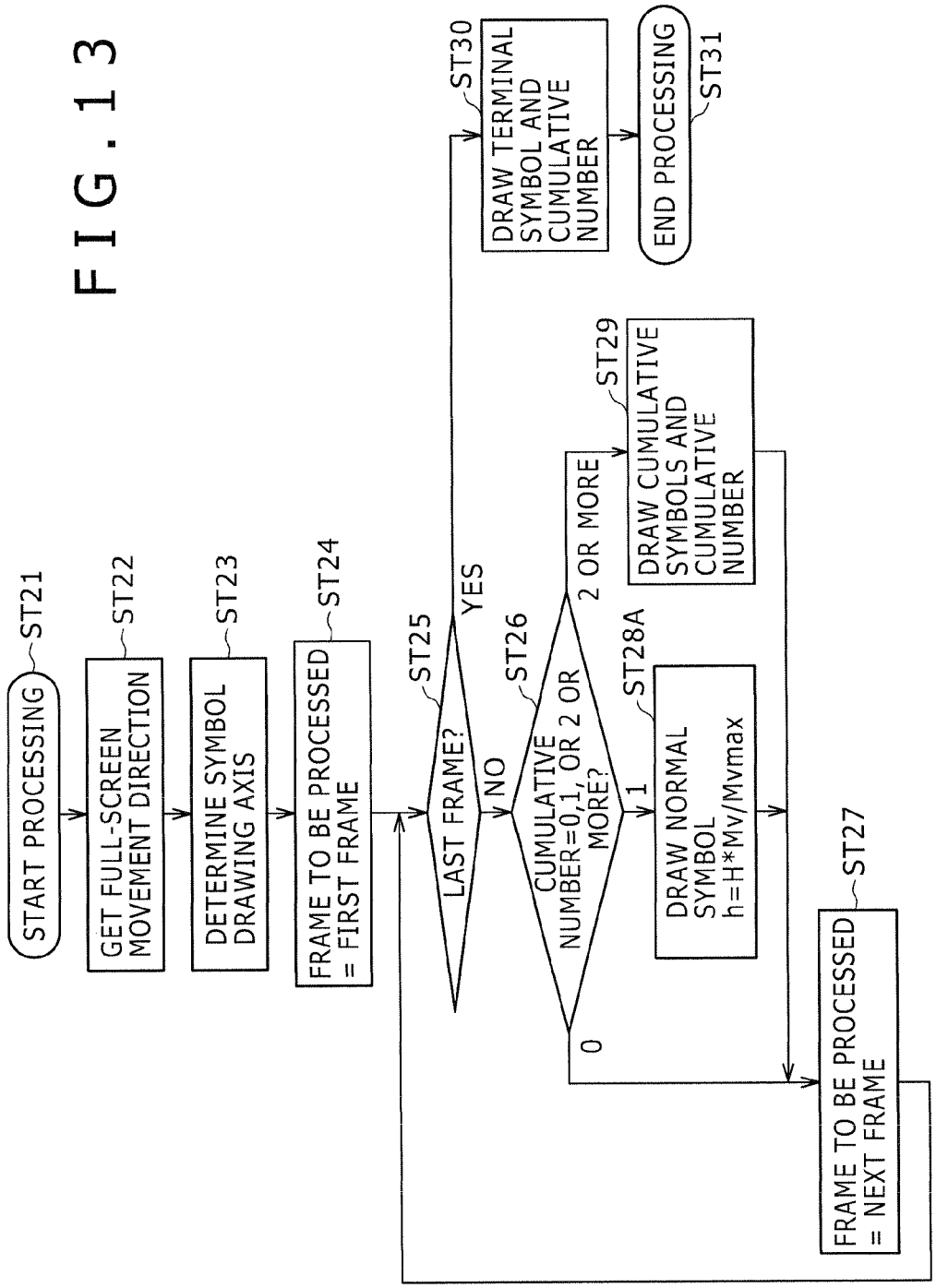
FIG. 13 is a flowchart indicative of an exemplary processing procedure to be executed by the symbol drawing block.

The flowchart shown in FIG. 13 is indicative of an exemplary procedure to be executed by the symbol drawing block 105 in the above-mentioned case. With FIG. 13, the steps similar to those shown in FIG. 4 are denoted by the same numbering and detail description thereof will be skipped. In the flowchart shown in FIG. 13, the step ST28A is inserted for step ST28 in the flowchart shown in FIG. 4.

In the step ST28A, if the cumulative number is 1, the symbol drawing block 105 moves to the processing of the step ST28A. In the step ST28A, the symbol drawing block 105 draws a normal symbol as a symbol at the position corresponding to the current frame (the current screen) of the representative image (the union image). In this case, the symbol drawing block 105 sets the length h of the normal symbol to be drawn to H*Mv/Mvmax as described above, thereby making the length h equal to the length corresponding to the magnitude of the full-screen movement Mv of the current frame.

After the processing of the step ST28A, the symbol drawing block 105 sets the processing frame to the next frame in the step ST27 and then returns to the processing of the step ST25. It should be noted that, although detail description is skipped, the other steps in the flowchart shown in FIG. 13 are generally the same as the corresponding steps in the flowchart shown in FIG. 4.

Figure 14A:
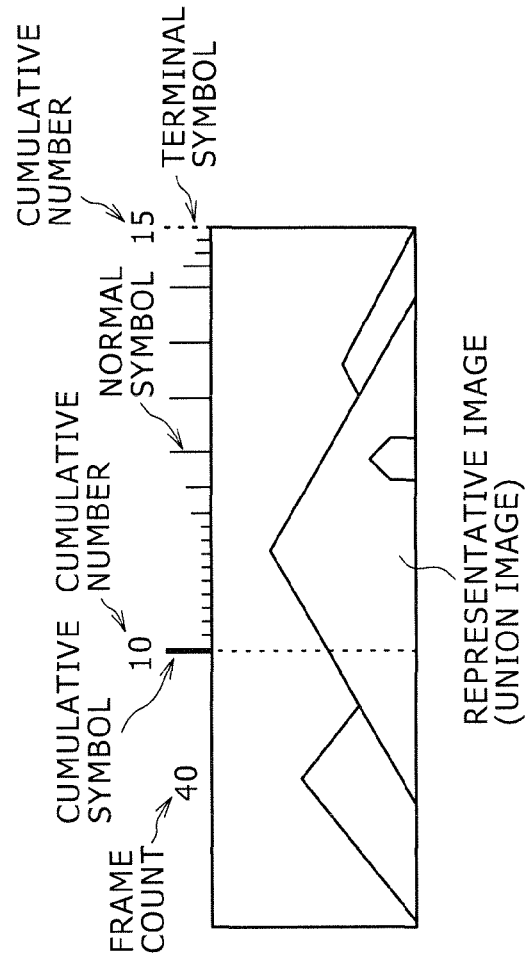
FIGS. 14A and 14B are diagrams illustrating exemplary drawings drawn by the symbol drawing processing.
Figure 14B:
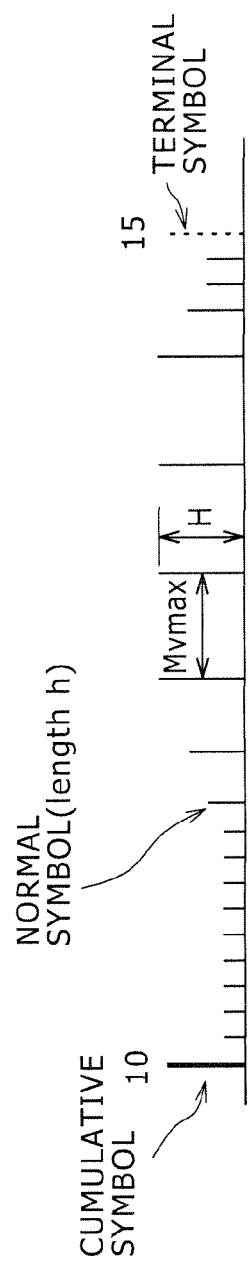

FIG. 14A shows an exemplary drawing by the symbol drawing processing in the flowchart shown in FIG. 13. In this drawing example, the number of frames (screens) making up a predetermined scene is 40 and the cumulative number and the total value of each frame (each screen) are as shown in FIG. 3. In this drawing example, unlike the above-mentioned drawing example shown in FIG. 5, the length of each normal symbol is the length corresponding to the magnitude of the full-screen movement. FIG. 14B shows an expanded view of the symbol section shown in FIG. 14A. As described above, the length h of each normal symbol is H*Mv/Mvmax, so that the length h of each normal symbol drawn on the screen of the maximum movement Mvmax in the full-screen movements is H.

Figure 15:
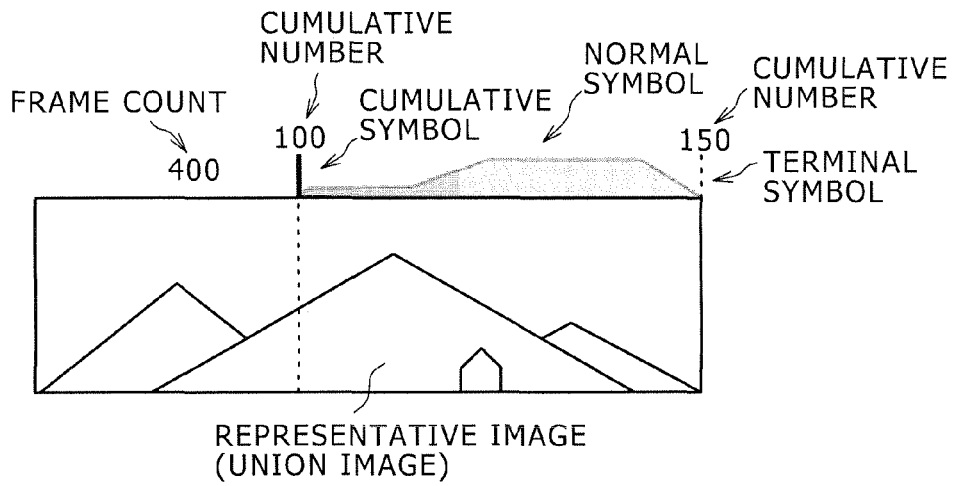
FIG. 15 is a diagram illustrating exemplary drawings drawn by the symbol drawing processing.

FIG. 15 also shows an exemplary drawing by the symbol drawing processing in the flowchart shown in FIG. 13. In this drawing example, the number of frames (screens) making up a predetermined scene is 400. In this case, the normal symbols to be drawn are crowded (or in a filled-in state) as shown. However, because the length of each normal symbol is the length corresponding to the magnitude of the full-screen movement, the approximate trend of the full-screen movement of each screen can be understood by an envelope line although the fine movement of the screen may not be seen.

As described above, executing the symbol drawing processing described in the flowchart shown in FIG. 13 makes the length of each normal symbol drawn in each screen correspond to the full-screen movement of that screen, thereby increasing the information volume indicated by this normal symbol.

Another Exemplary Symbol Drawing Processing

In the above-mentioned example, normal symbols are drawn in all the screens with the cumulative number being 1 (generally, the cumulative number is 1 to N (N being an integer equal to or higher than 1)) in the symbol drawing block 105. This, however, may make the drawn normal symbols be crowded too much, resulting in the overlapped display of the normal symbols. In order to circumvent this problem, a method is considered in which the proximity between drawn symbols is determined and, in accordance with the result of this determination, the manner of drawing normal symbols is changed.

2. Second Embodiment

Exemplary Configuration of Image Processing Apparatus

Figure 16:
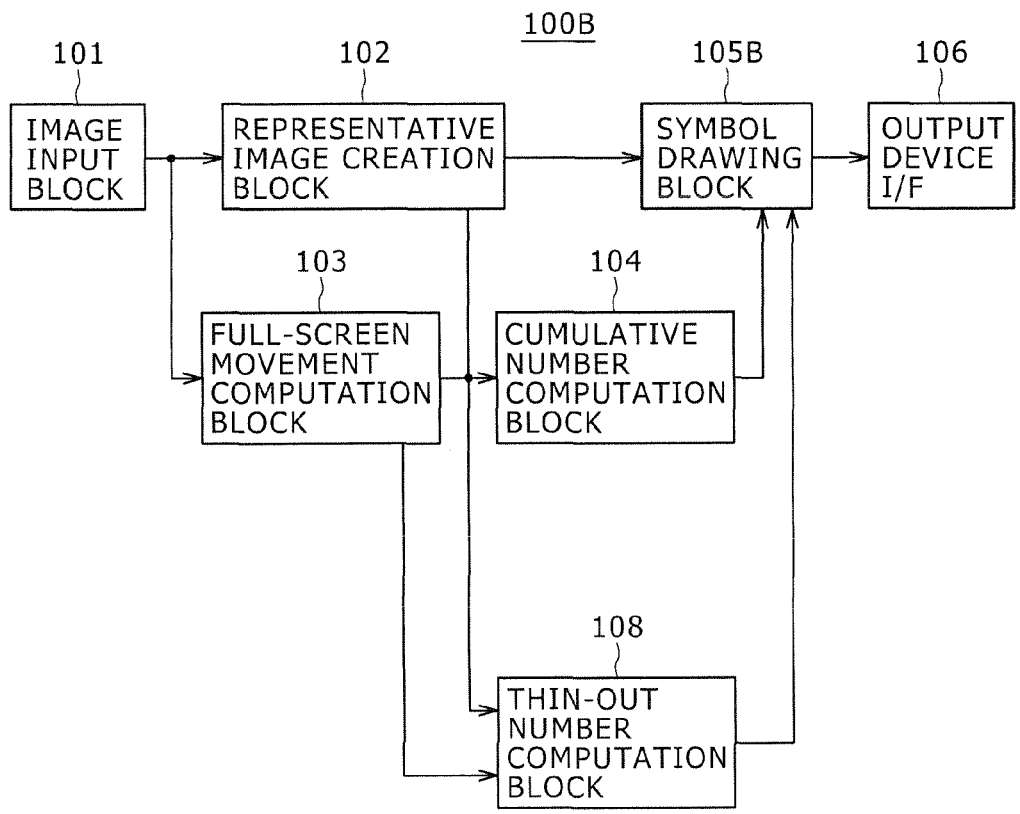
FIG. 16 is a block diagram illustrating an exemplary configuration of an image processing apparatus practiced as a second embodiment of the invention.

Referring to FIG. 16, there is shown an exemplary configuration of an image processing apparatus 100B practiced as the second embodiment of the invention. The image processing apparatus 100B has an image input block 101, a representative image creation block 102, a full-screen movement computation block 103, a cumulative number computation block 104, a symbol drawing block 105B, an output device interface I/F 106, and a thin-out number computation block 108. With reference to FIG. 16, components similar to those previously described in FIG. 1 are denoted by the same reference numerals and detail description thereof is skipped.

Figure 17A:
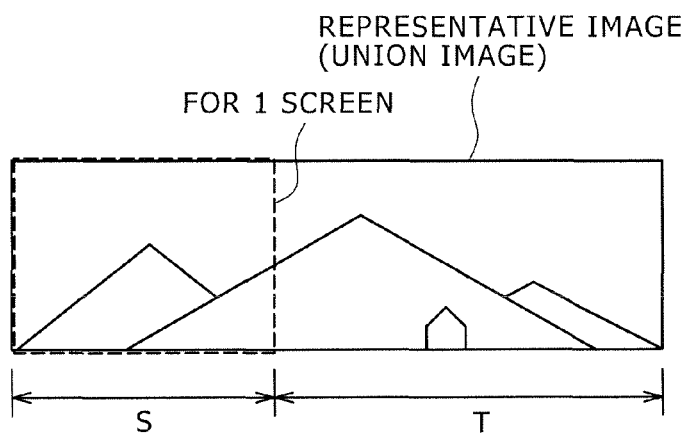
FIGS. 17A and 17B are diagrams indicative of length S in the full-screen movement direction of a screen for computing the distance d of a symbol in the most proximity in a display area, total value T of full-screen movement, and length W in the full-screen movement direction of a display area of a representative image in an output device.
Figure 17B:
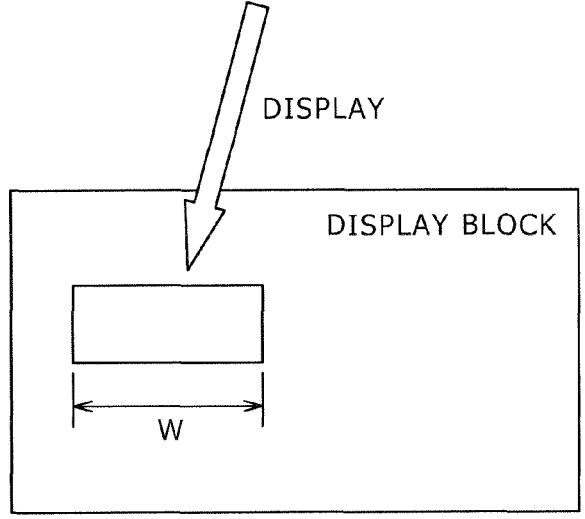

For example, the distance d between the symbols that are closest to each other in the display area is computed to determine the proximity between the symbols on the basis of the obtained distance d. The distance d is computed by equation (1) below by use of the length S in the full-screen movement direction of the screen, the total value T of the full-screen movements, the minimum movement Vmin at the time when there is no accumulation in the full-screen movement, and the length W in the full-screen movement direction of the display area of the representative image in the output device. FIG. 17 shows the correspondence between the length S, the total value T, and the length W.

$$d = W * V\text{min}/(S+T) \qquad (1)$$

Figure 18:
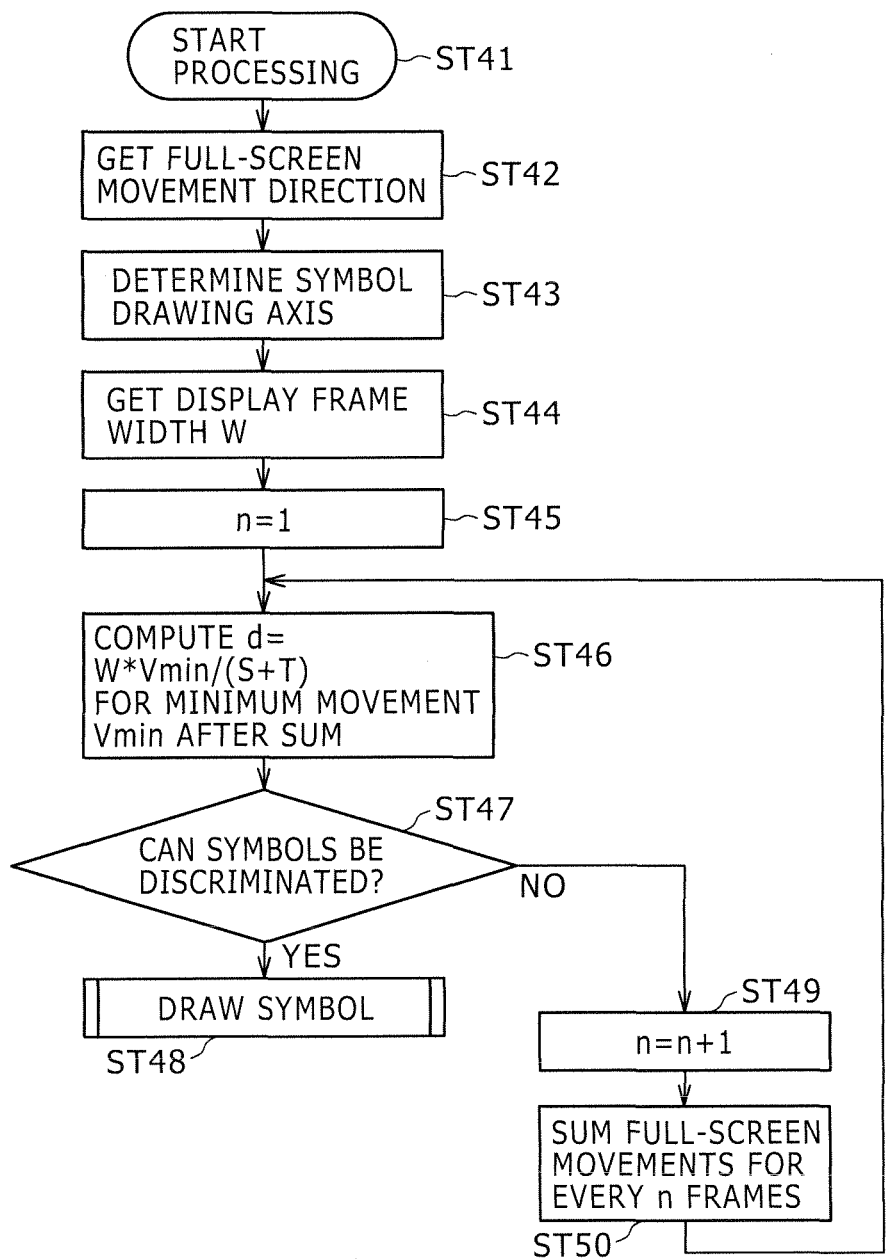
FIG. 18 is a flowchart indicative of an exemplary processing procedure to be executed by the symbol drawing block.

With the symbol drawing block 105B, it is considered that normal symbols are drawn for a predetermined number of screens such that the distance d between the symbols closest to each other in the display area exceeds a predetermined value. In this case, the normal symbols are thinned out before being drawn. The flowchart shown in FIG. 18 shows one example of a processing procedure to be executed by the thin-out number computation block 108 configured to obtain the thin-out number n in this case.

In the step ST41, the thin-out number computation block 108 starts processing and then moves to the processing of the step ST42. In the step ST42, the thin-out number computation block 108 obtains a full-screen movement direction. For example, the movement direction may be horizontal, vertical, or oblique. In this case, the thin-out number computation block 108 obtains a full-screen movement direction on the basis of the full-screen movement (the motion vector) of each screen computed by the full-screen movement computation block 103, for example.

Next, in the step ST43, the thin-out number computation block 108 determines the symbol drawing axis. In this case, the symbol drawing block 105B determines the symbol drawing axis such that the symbol drawing axis corresponds to the full-screen movement direction obtained in the step ST42. For example, if the full-screen movement direction is horizontal, the symbol drawing axis is determined in the horizontal direction.

Next, the thin-out number computation block 108 obtains the size W of a display frame, namely, the above-mentioned length W in the full-screen movement direction in the display area of the representative image in the output device. The information about this length W is given by the user operation or automatically obtained from the output device through the output device interface I/F 106.

Next, in the step ST45, the thin-out number computation block 108 sets the frame combined total number n to 1. Then, in the step ST46, the symbol drawing block 105B computes distance d by the above-mentioned equation (1) for the minimum movement Vmin of the frame after the combined total number. Then, in the step ST47, the thin-out number computation block 108 determines whether this computed distance d is a value (2 for example) that allows the discrimination of the drawing symbol. If the distance d is smaller than the size of the drawing symbol, the drawn symbol may be difficult for the user to recognize.

If distance d is a value that allows the discrimination of the drawing symbol, then the thin-out number computation block 108 moves to the processing of the symbol drawing block 105B in the step ST48. On the other hand, if the distance d is a value that does not allow the discrimination of the drawing symbol, then the thin-out number computation block 108 moves to the processing of the step ST49. In the step ST49, the thin-out number computation block 108 increments the frame combined total number n by 1. Then, in the step ST50, the thin-out number computation block 108 combined-totals the full-screen movements for each n frame, thereafter returning to the processing of the step ST46.

Figure 19:
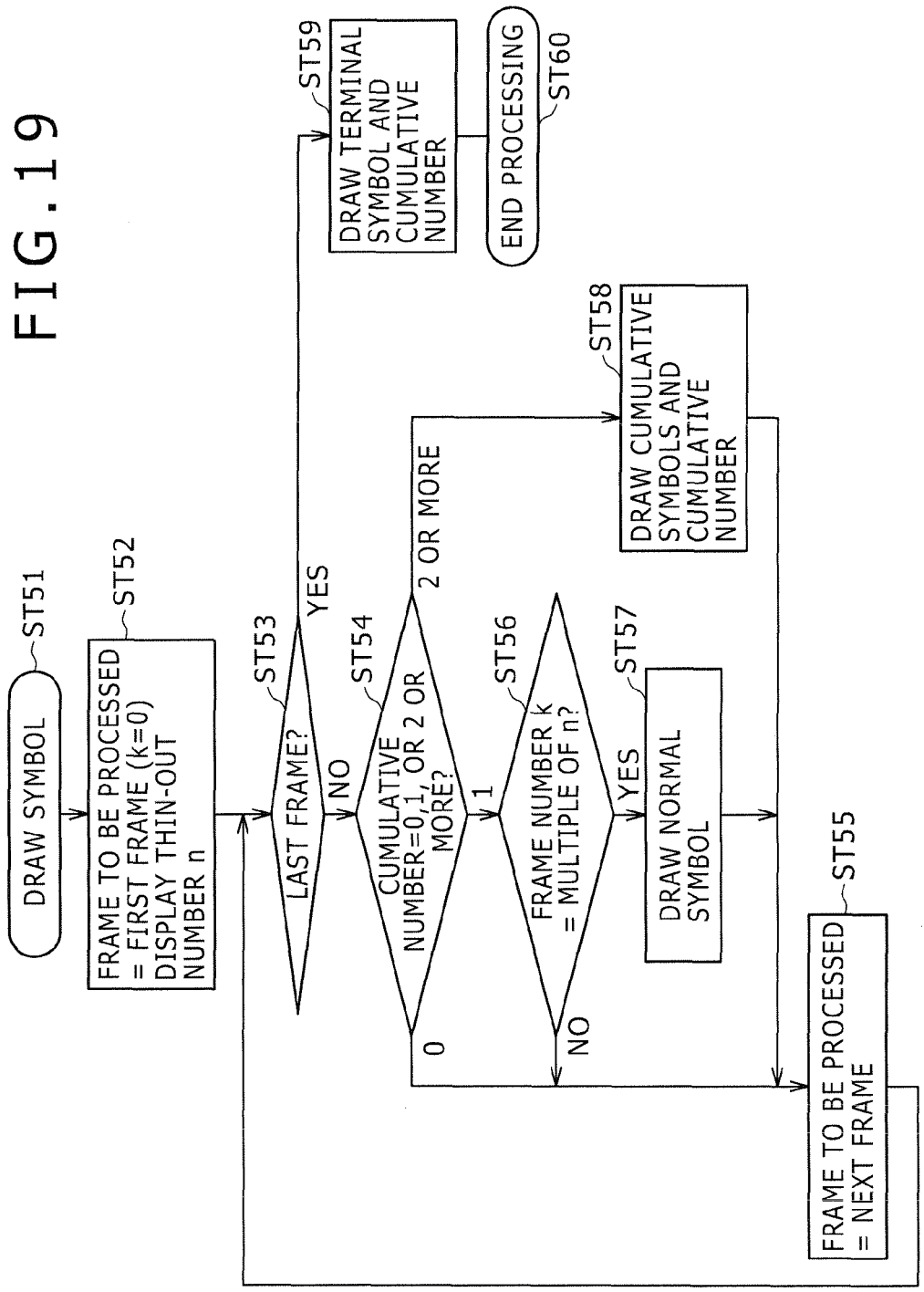
FIG. 19 is a flowchart indicative of another exemplary processing procedure to be executed by the symbol drawing block.

The flowchart shown in FIG. 19 shows the symbol drawing processing of the step ST48 of the flowchart shown in FIG. 18. In the step ST51, the symbol drawing block 105B starts processing and then moves to the processing of the step ST52. In the step ST52, the symbol drawing block 105B sets the processing frame (the processing screen) to the first frame (the first screen). Namely, the symbol drawing block 105B sets the frame number k of the processing to 0. At the same time, the symbol drawing block 105B displays the thin-out number n.

Next, in the step ST53, the symbol drawing block 105B determines whether the processing frame is the last frame (the last screen) or not. If the processing frame is found not to be the last frame, the symbol drawing block 105B moves to the processing of the step ST54. In the step ST54, the symbol drawing block 105B determines whether the cumulative number is 0, 1, 2 or more.

If the cumulative number is found to be 0, the symbol drawing block 105B does not draw a symbol, sets the processing frame to the next frame in the step ST55, and then returns to the processing of the step ST53. If the cumulative number is found to be 1, the symbol drawing block 105B moves to the processing of the step ST56. In the step ST56, the symbol drawing block 105B determines whether the current frame number k is a multiple of n or not.

If the current frame number k is found to be a multiple of n, then the symbol drawing block 105B moves to the processing of the step ST57. In the step ST57, the symbol drawing block 105B draws a normal symbol as a symbol at the position corresponding to the current frame (the current screen) of the representative image (the union image). Next, after the processing of the step ST57, the symbol drawing block 105B sets the processing frame to the next frame in the step ST55, and then returns to the processing of the step ST53. On the other hand, if the current frame number k is found not to be a multiple of n, then the symbol drawing block 105B sets the processing frame to the next frame in the step ST55 and returns to the processing of the step ST53. Consequently, the drawing of the normal symbols is executed once in n frames, thereby thinning out the symbols.

If the cumulative number is found to be 2 or more in the step ST54, then the symbol drawing block 105B moves to the processing of the step ST58. In the step ST58, the symbol drawing block 105B draws a cumulative symbol as a symbol at the position corresponding to the current frame (the current screen) of the representative image (the union image). This cumulative symbol can be distinguished from the above-mentioned normal symbol by shape, size, pattern, or color.

In addition, in the step ST58, the symbol drawing block 105B further draws a cumulative number at the position corresponding to the position at which the cumulative symbol has been drawn. Then, after the processing of the step ST58, the symbol drawing block 105B sets the processing frame to the next frame and then returns to the processing of the step ST53.

If the processing frame is found to be the last frame in the step ST53, then the symbol drawing block 105B moves to the processing of the step ST59. In the step ST59, the symbol drawing block 105B draws a terminal symbol as a symbol at the position corresponding to the current frame (=last current frame) of the representative image (the union image). This terminal symbol can be distinguished from the above-mentioned normal symbol and cumulative symbol by shape, size, pattern, or color.

In addition, in the step ST59, the symbol drawing block 105B further draws a cumulative number at the position at which the terminal symbol has been drawn. Then, after the processing of the step ST59, the symbol drawing block 105B ends the processing in the step ST60.

Figure 20:
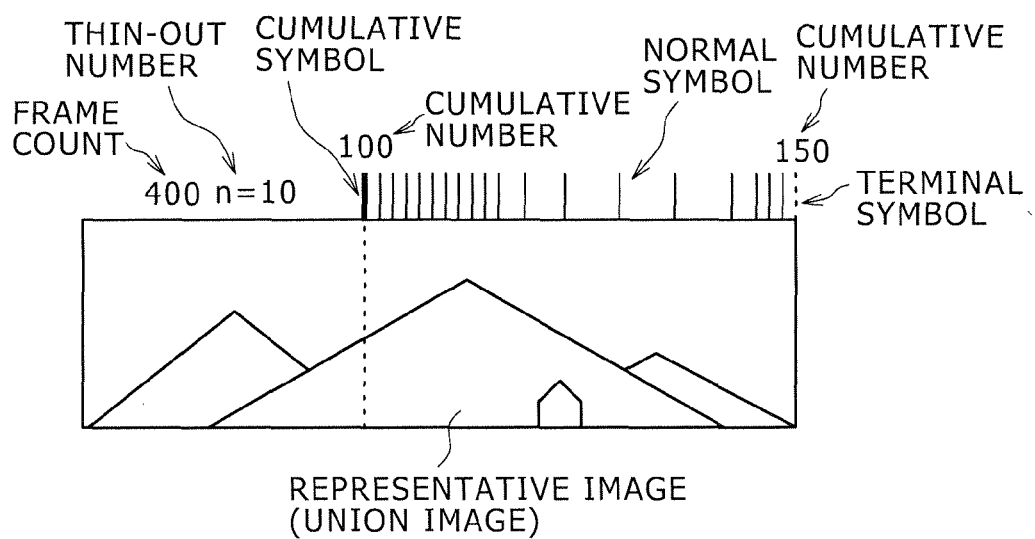
FIG. 20 is a diagram illustrating an exemplary drawing drawn by the symbol drawing processing.

Referring to FIG. 20, there is shown an exemplary drawing by the symbol drawing processing in the flowcharts shown in FIG. 18 and FIG. 19. In this drawing example, the number of frames (screens) making up a predetermined scene is 400 and n=10. Thus, executing the symbol drawing processing shown in the flowcharts of FIG. 18 and FIG. 19 thins out the normal symbols before being drawn. Hence, if the display size of the representative image on the output device is relatively small, the drawn normal symbols are not too crowded to prevent the understanding of the full-screen movements from getting difficult.

It should be noted that, in the processing described in the flowchart shown in FIG. 18, n is changed from 1 until the distance d becomes the value at which the drawn symbols can be discriminated from each other, thereby obtaining the final value of n related with the ratio of thin-out. However, the method of obtaining the value of n is not restricted to the above-mentioned method. For example, simply the value of n may be an integer close to the reciprocal 1/d of d. For example, instead of changing n from 1, the final value of n may be obtained by increasing or decreasing n from an integer value close to the reciprocal 1/d of d.

Another Exemplary Symbol Drawing Processing

In the processing described in the flowchart shown in FIG. 19, the normal symbols drawn by the symbol drawing block 105 are expressed by the line segments of the same length. However, it is also practicable to set this length of the normal symbols to the length corresponding to the full-screen movement of each screen. In this case, the length h of the normal symbol drawn on a predetermined screen is H*Mv/Mvmax, where H is the length in the direction orthogonal to the direction of the full-screen movement of the display area on the rim of the output device, Mvmax is the maximum movement in the full-screen movements, and Mv is the full-screen movement of each screen.

Figure 21:
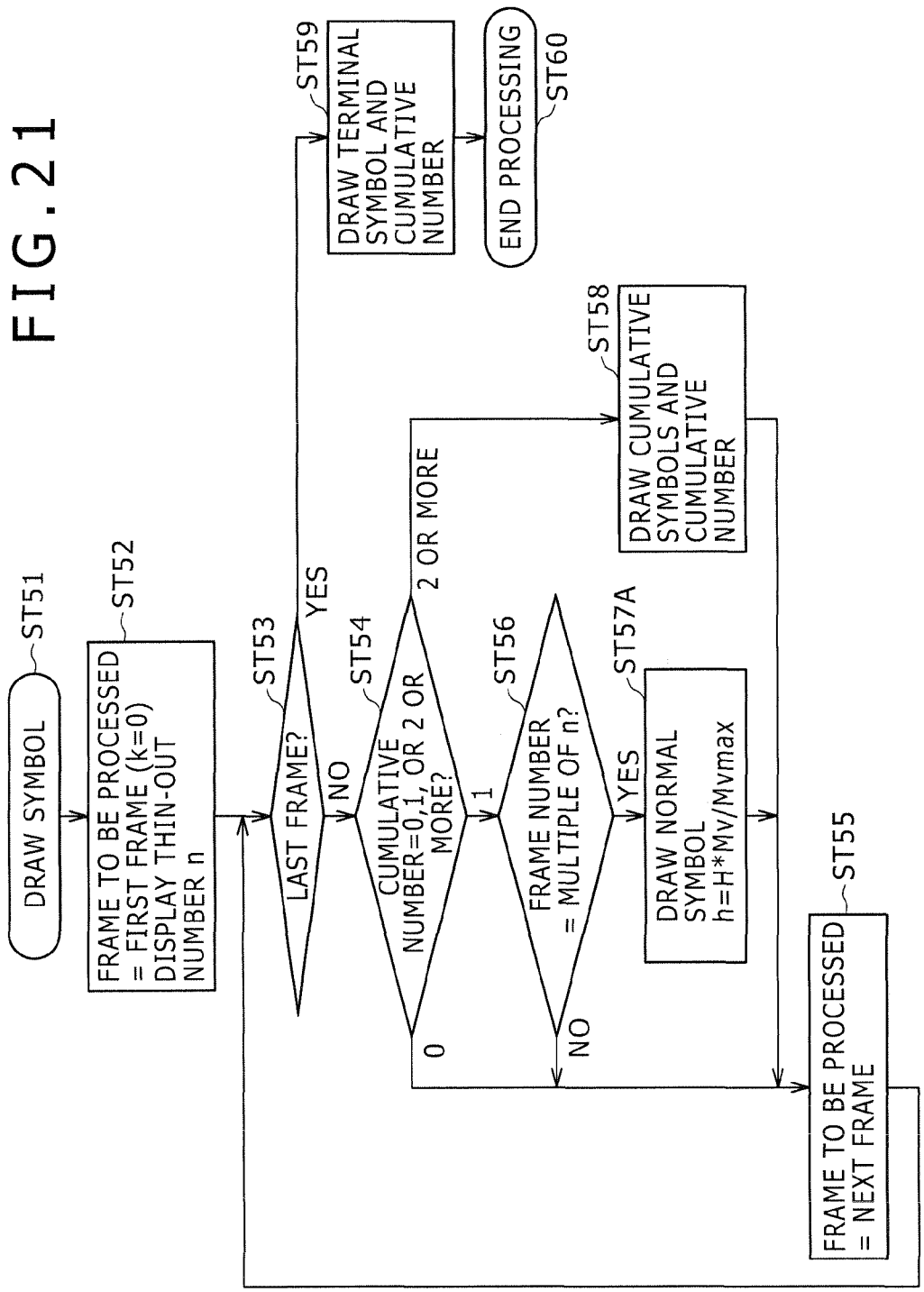
FIG. 21 is a flowchart indicative of still another exemplary processing procedure to be executed by the symbol drawing block.

The flowchart shown in FIG. 21 is indicative of an exemplary processing procedure to be executed by the symbol drawing block 105B in this case. Referring to FIG. 21, the steps corresponding to those previously described with reference to FIG. 19 are denoted by the same reference numerals and the detail description thereof is skipped. In the flowchart shown in FIG. 21, the step ST57A is inserted instead of the step ST57 of the flowchart shown in FIG. 19.

If the frame number k is found to be a multiple of n in the step ST56, then the symbol drawing block 105B moves to the processing of the step ST57A. In the step ST57A, the symbol drawing block 105B draws a normal symbol as a symbol at the position corresponding to the current frame (the current screen) of the representative image (the union image). In this case, the symbol drawing block 105B sets the length h of the normal symbol to be drawn to H*Mv/Mvmax as described above so as to make this length correspond to the size Mv of the full-screen movement of the current frame.

After the processing of the step ST57A, the symbol drawing block 105B sets the processing frame to the next frame in the step ST55 and then returns to the processing of the step ST53. It should be noted that, although details are skipped, the other steps in the flowcharts shown in FIG. 21 are substantially the same as those in the flowchart shown in FIG. 19.

Figure 22:
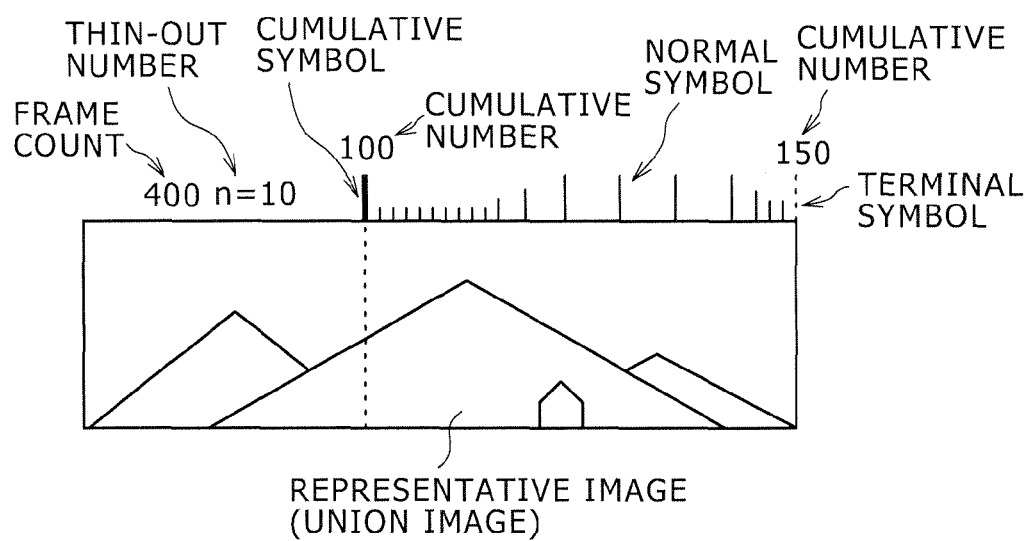
FIG. 22 is an exemplary drawing drawn by the symbol drawing processing.

Referring to FIG. 22, there is shown an exemplary drawing by the symbol drawing processing according to the flowchart shown in FIG. 21. In this drawing example, the number of frames (screens) making up a predetermined scene is 400 and n=10. Thus, executing the symbol drawing processing shown in the flowchart of FIG. 21 thins out the normal symbols before being drawn. Hence, if the display size of the representative image on the output device is relatively small, the drawn normal symbols are not too crowded to prevent the understanding of the full-screen movements from getting difficult. In addition, executing the symbol drawing processing specified by the flowchart shown in FIG. 21 makes the length of the normal symbol to be drawn every time the frame number k is a multiple of n correspond to the full-screen movement of that screen, thereby increasing the information volume indicated by this normal symbol.

Another Exemplary Symbol Drawing Processing

In the above-mentioned processing described by the flowchart shown in FIG. 19, the normal symbols are drawn in the screen with the frame number k being a multiple of n; in the other screens, however, no normal symbol is drawn. However, it is considered that, in the screen with the frame number k being a multiple of n, each normal symbol may be drawn in a dark tone, while, in the other screens, each normal symbol may be drawn in a light tone.

Figure 23:
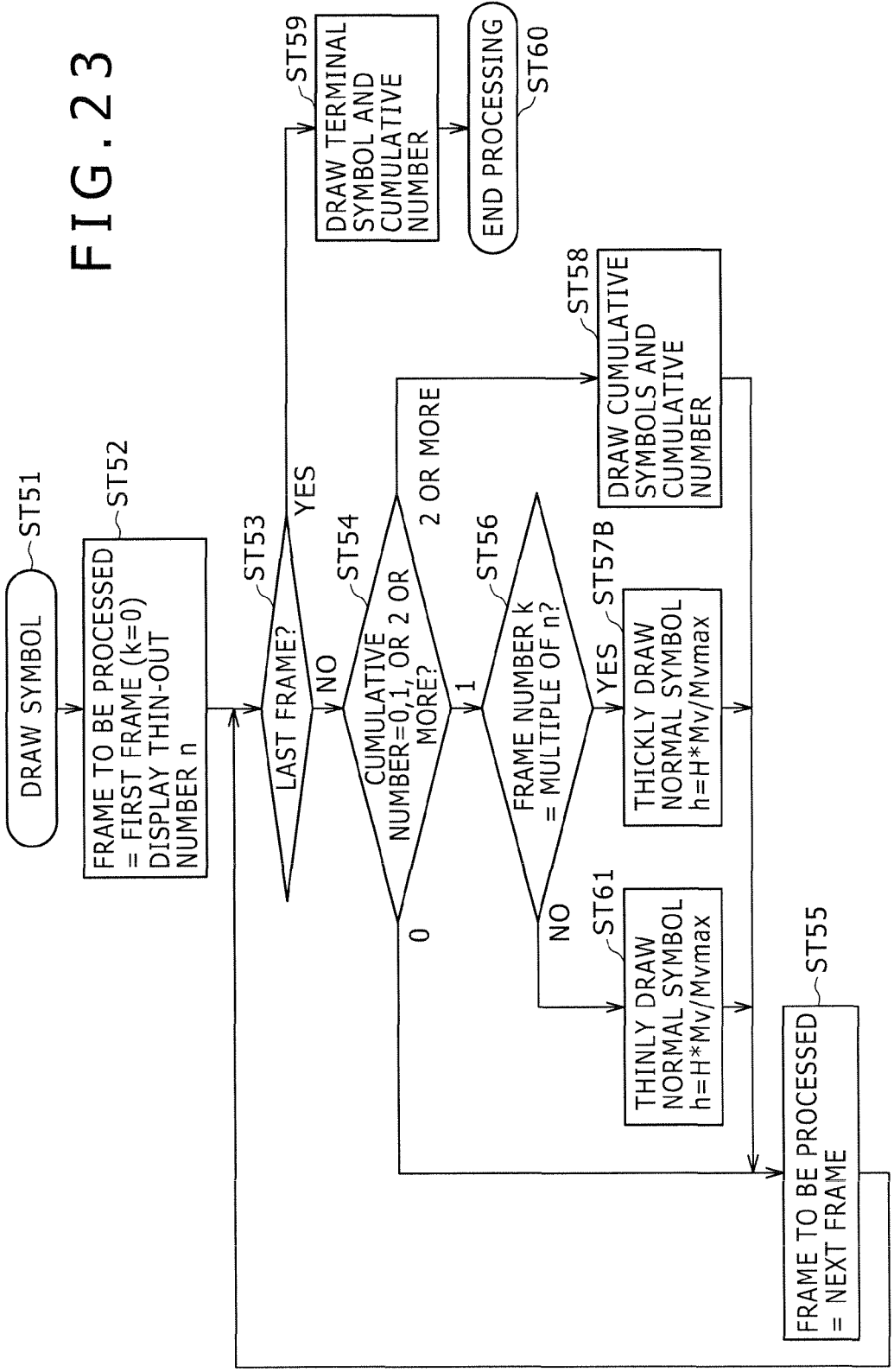
FIG. 23 is a flowchart indicative of yet another exemplary processing procedure to be executed by the symbol drawing block.

The flowchart shown in FIG. 23 is indicative of an exemplary processing procedure to be executed by the symbol drawing block 105B in the above-mentioned case. Referring to FIG. 23, the steps corresponding to those previously described with reference to FIG. 21 are denoted by the same reference numerals and the detail description thereof is skipped. In the flowchart shown in FIG. 23, the step ST57B is inserted instead of the step ST57A of the flowchart shown in FIG. 21. In addition, the step ST61 is added as a processing step to be executed when the frame number k is not a multiple of n.

If the frame number k is found to be a multiple of n in the step ST56, then the symbol drawing block 105B moves to the processing of the step ST57B. In the step ST57B, the symbol drawing block 105B draws in a dark tone a normal symbol as a symbol at the position corresponding to the current frame (the current screen) of the representative image (the union image). In this case, the symbol drawing block 105B sets the length h of the normal symbol to be drawn to H*Mv/Mvmax as described above, thereby making this length correspond to the size Mv of the full-screen movement of the current frame. After the processing of the step ST57B, the symbol drawing block 105B sets the processing frame to the next frame in the step ST55 and then returns to the processing of the step ST53.

If the frame number k is found not to be a multiple of n in the step ST56, then the symbol drawing block 105B moves to the processing of the step ST61. In the step ST61, the symbol drawing block 105 draws a normal symbol in a light tone as a symbol at the position corresponding to the current frame (the current screen) of the representative image (the union image). In this case, the symbol drawing block 105B sets the length h of the normal symbol to be drawn to H*Mv/Mvmax as described above, thereby making this length correspond to the size Mv of the full-screen movement of the current frame. After the processing of the step ST61, the symbol drawing block 105B sets the processing frame to the next frame in the step ST55 and then returns to the processing of the step ST53. It should be noted that, although details are skipped, the other steps in the flowcharts shown in FIG. 23 are substantially the same as those in the flowchart shown in FIG. 21.

Figure 24:
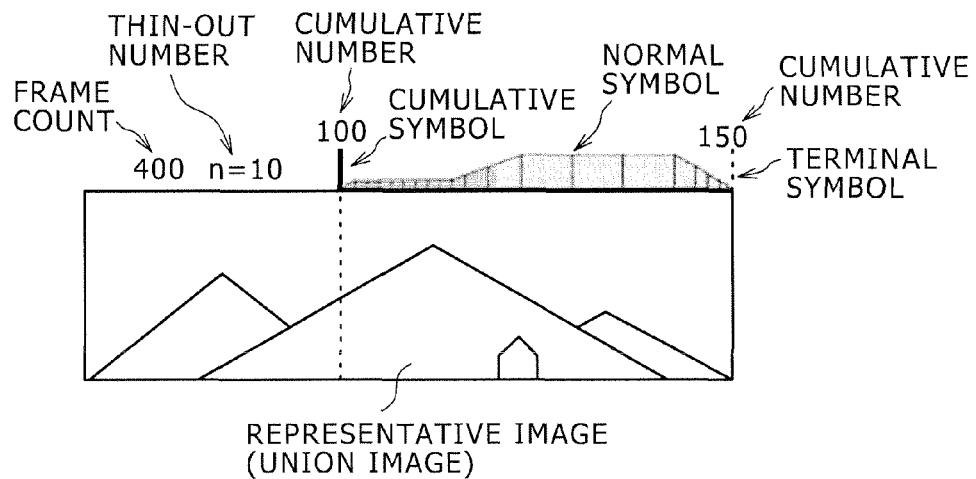
FIG. 24 is a drawing illustrating an exemplary drawing drawn by the symbol drawing processing.

Referring to FIG. 24, there is shown an exemplary drawing executed by the symbol drawing processing according to the flowchart shown in FIG. 23. In this drawing example, the number of frames (screens) making up a predetermined scene is 400 and n=10. Thus, in the symbol drawing processing according to the flowchart shown in FIG. 23, the normal symbols drawn in a dark tone are thinned out. Hence, if the display size of the representative image on the output device is relatively small, the drawn normal symbols are not too crowded to prevent the understanding of the full-screen movements from getting difficult. In addition, in this case, the length of each normal symbol drawn in each screen corresponds to the full-screen movement of that screen, thereby increasing the information volume indicated by this normal symbol.

3. Third Embodiment

Exemplary Configuration of Image Processing Apparatus

Figure 25:
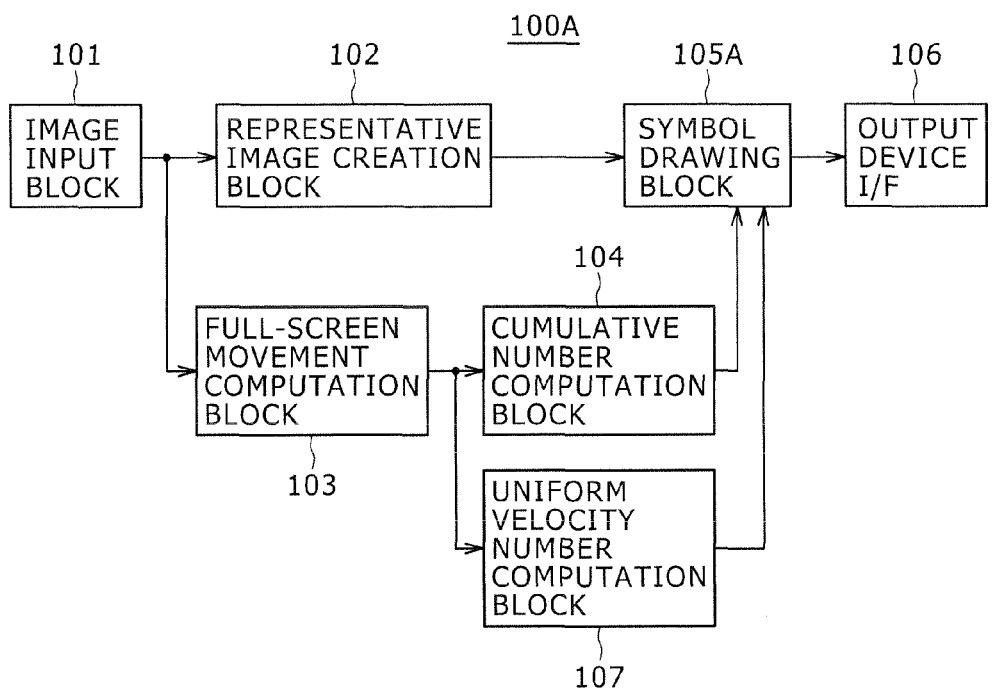
FIG. 25 is a block diagram illustrating an exemplary configuration of an image processing apparatus practiced as a third embodiment of the invention.

Referring to FIG. 25, there is shown an exemplary configuration of an image processing apparatus 100A practiced as the third embodiment of the invention. The image processing apparatus 100A has an image input block 101, a representative image creation block 102, a full-screen movement computation block 103, a cumulative number computation block 104, a symbol drawing block 105A, an output device interface (I/F) 106, and a uniform velocity number computation block 107. Referring to FIG. 25, components similar to those previously described with reference to FIG. 1 are denoted by the same reference numerals and detailed description thereof is appropriately skipped.

The image input block 101 inputs an image signal to be processed into the image processing apparatus 100A. This image signal to be processed is obtained by taking a subject with an imaging device (a camera) for example and supplied directly from the imaging device (the camera) or from a predetermined recording media. In the image input block 101, the inputted image signal is processed to detect a scene change point and the processed image signal is divided for each scene. Then, the image signal for each scene is sequentially supplied to the representative image creation block 102 and the full-screen movement computation block 103.

The representative image creation block 102, the full-screen movement computation block 103, the cumulative number computation block 104, the uniform velocity number computation block 107, and the symbol drawing block 105A sequentially execute the processing of each scene. The following describes the processing to be executed by each of the above-mentioned blocks with a scene to be processed as a predetermined scene. The representative image creation block 102 processes an image signal of the predetermined scene, creates a union image obtained by linking the images of the screens (the frames) making up the predetermined scene, and sets the obtained union image to the representative image of the predetermined scene. The full-screen movement computation block 103 processes the image signal of the predetermined scene to compute a full-screen movement (a motion vector) of each screen in this predetermined scene. The cumulative number computation block 104 computes a cumulative number of each screen on the basis of the full-screen movement of each screen in the predetermined scene computed by the full-screen movement computation block 103 (refer to FIG. 2 and FIG. 7).

The uniform velocity number computation block 107 computes the uniform velocity number of each screen on the basis of the full-screen movement of each screen in the predetermined scene computed by the full-screen movement computation block 103.

Uniform Velocity Number Computation Processing

Figure 26:
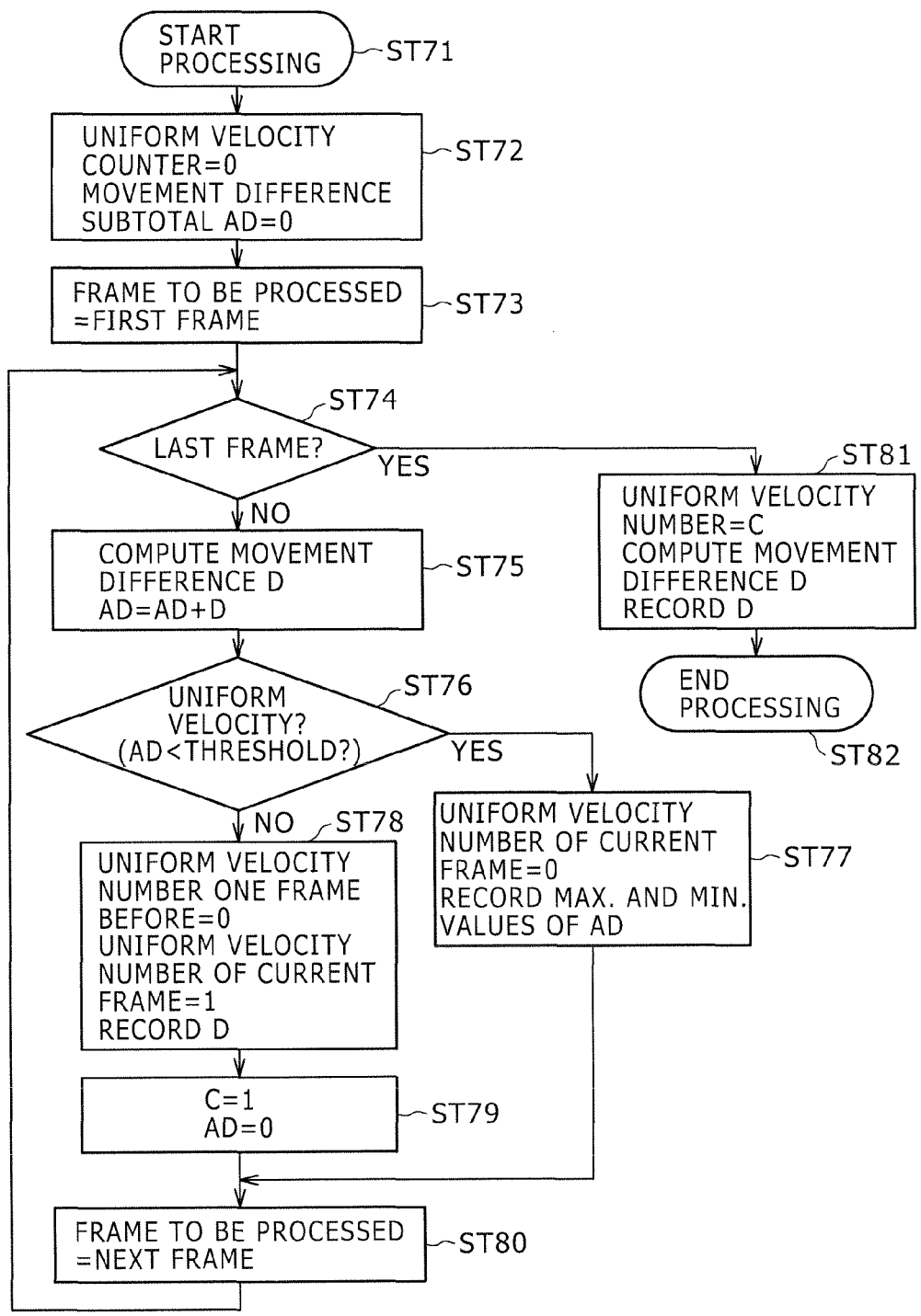
FIG. 26 is a flowchart indicative of an exemplary processing procedure to be executed by a uniform velocity number computation block.

The flowchart shown in FIG. 26 is indicative of an exemplary processing procedure to be executed by the uniform velocity number computation block 107. In the step ST71, the uniform velocity number computation block 107 starts processing and then moves to the processing of the step ST72. In the step ST72, the uniform velocity number computation block 107 sets the value of uniform velocity counter C to 0 and the value of the movement difference subtotal AD to 0. Then, in the step ST73, the uniform velocity number computation block 107 sets the processing frame (the processing screen) to the first frame (the first screen).

Next, in the step ST74, the uniform velocity number computation block 107 determines whether the processing frame is the last frame (the last screen) or not. If the processing frame is found not to be the last frame, the uniform velocity number computation block 107 moves to the processing of the step ST75. In the step ST75, the uniform velocity number computation block 107 subtracts the full-screen movement of the preceding frame from the full-screen movement of the current frame to compute the full-screen movement difference subtotal AD of the current frame. Further, the uniform velocity number computation block 107 adds the full-screen movement difference D to the movement difference subtotal AD to obtain the movement difference subtotal AD in the current frame.

Next, in the step ST76, the uniform velocity number computation block 107 determines whether there is a uniform velocity or not. Here, the uniform velocity number computation block 107 determines whether there is a uniform velocity or not by determining whether the movement difference subtotal AD is within the range of threshold or not. Namely, the uniform velocity number computation block 107 determines that there is a uniform velocity if AD is within the range of threshold and there is no uniform velocity if AD is outside the range of threshold.

If a uniform velocity is found, the uniform velocity number computation block 107 moves to the processing of the step ST77. In the step ST77, the uniform velocity number computation block 107 sets the uniform velocity number of the current frame to 0 and increments the value of the uniform velocity counter C by 1. In addition, in the step ST77, the uniform velocity number computation block 107 records the maximum and minimum values of the movement difference subtotal AD. This recording information provides information (metadata) indicative of a degree of the movement difference subtotal AD in the case where there is a uniform velocity. For example, on the basis of this information, the threshold value may be adaptively changed.

If no uniform velocity is found in the step ST76, then the uniform velocity number computation block 107 moves to the processing of the step ST78. In the step ST78, the uniform velocity number computation block 107 sets the uniform velocity number of the immediately preceding frame (the immediately preceding screen) to the value of the uniform velocity counter C and the uniform velocity number of the current frame to 1 and records the full-screen movement difference D of the current frame. Then, in the step ST79, the uniform velocity number computation block 107 sets the value of the uniform velocity counter C to 1 and resets the movement difference subtotal AD to 0.

After the processing of the step ST77 and the processing of the step ST79, the uniform velocity number computation block 107 moves to the processing of the step ST80. In the step ST80, the uniform velocity number computation block 107 sets the processing frame to the next frame and then returns to the processing of the step ST74.

If the processing frame is found to be the last frame in the step ST74, then the uniform velocity number computation block 107 moves to the processing of the step ST81. In the step ST81, the uniform velocity number computation block 107 sets the uniform velocity number of the current frame (=the last frame) to the value of the uniform velocity counter C. At the same time, in the step ST81, the uniform velocity number computation block 107 computes the full-screen movement difference D of the current frame and records the computed the full-screen movement difference D. Then, the uniform velocity number computation block 107 ends the processing in the step ST82.

Referring to FIG. 17, there is shown one example of the full-screen movement Mv of each frame and the cumulative number, total value, movement difference, and uniform velocity number that are obtained by this full-screen movement Mv of each frame when the number of frames (screens) making up a predetermined scene is 40. The cumulative number and the total value are those obtained by the cumulative number computation processing executed according to the flowcharts shown in FIG. 2 and FIG. 7. The movement difference and the uniform velocity number are those obtained by the uniform velocity computation processing executed according to the above-mentioned flowchart shown in FIG. 25. In this example, the movement difference D is 0 from the frame 1 to the frame 10, so that continuous uniform velocity is determined to be present. At the frame 11, full-screen movement Mv is 50 and the movement difference D is 50, so that uniform velocity is determined not to be present. Hence, the uniform velocity number from the frame 1 to the frame 9 is determined to be 0 and that at the frame 10 is determined to be 10.

Further, in this example, the movement difference D from the frame 11 to the frame 17 is 0, so that continuous uniform velocity is determined to be present. At the frame 18, the movement difference D is 50, so that uniform velocity is determined not to be present. Hence, the uniform velocity number from the frame 11 to the frame 16 is 0 and the uniform velocity number at the frame 17 is 7. Also, in this example, the movement difference D from the frame 18 to the frame 20 is 50, so that continuous uniform velocity is determined not to be present. Hence, the uniform velocity number from the frame 18 to the frame 20 is 1.

In addition, in this example, the movement difference D from the frame 21 and the frame 22 is 0, so that uniform velocity is determined to be present. At the frame 23, the movement difference D is −50, so that uniform velocity is determined not to be present. Hence, the uniform velocity number of the frame 21 is 0 and the uniform velocity number of the frame 22 is 2. Also, in this example, the movement difference D from the frame 23 to the frame 25 is −50, so that continuous uniform velocity is determined not to be present. Hence, the uniform velocity number from the frame 23 to the frame 25 is 1. Besides, in this example, the movement difference D from the frame 26 to the frame 39 is 0, so that continuous uniform velocity is determined to be present. Hence, the uniform velocity number from the frame 27 to the frame 39 is 0 and the uniform velocity number of the frame 40 is 15.

It should be noted that, in the uniform velocity number computation processing according to the flowchart shown in FIG. 26, the determination of uniform velocity in the step ST76 is executed by determining whether the movement difference subtotal AD is within the threshold or not. However, it is also practicable to execute the determination of the presence of uniform velocity in a predetermined frame by determining whether the movement difference D in that frame is within the threshold or not.

The symbol drawing block 105A draws a symbol indicative of a full-screen movement on the rim of a representative image (a union image) created by the representative image creation block 102. In this case, the symbol drawing block 105A executes the drawing processing on the basis of the cumulative number of each screen computed by the cumulative number computation block 104 and the movement difference D and uniform velocity number of each screen computed by the uniform velocity number computation block 107. At the same time, the symbol drawing block 105A supplies the image signal (the image data) of the representative image with a symbol indicative of the full-screen movement drawn on the rim to the output device interface (I/F) 106.

Symbol Drawing Processing

Figure 28:
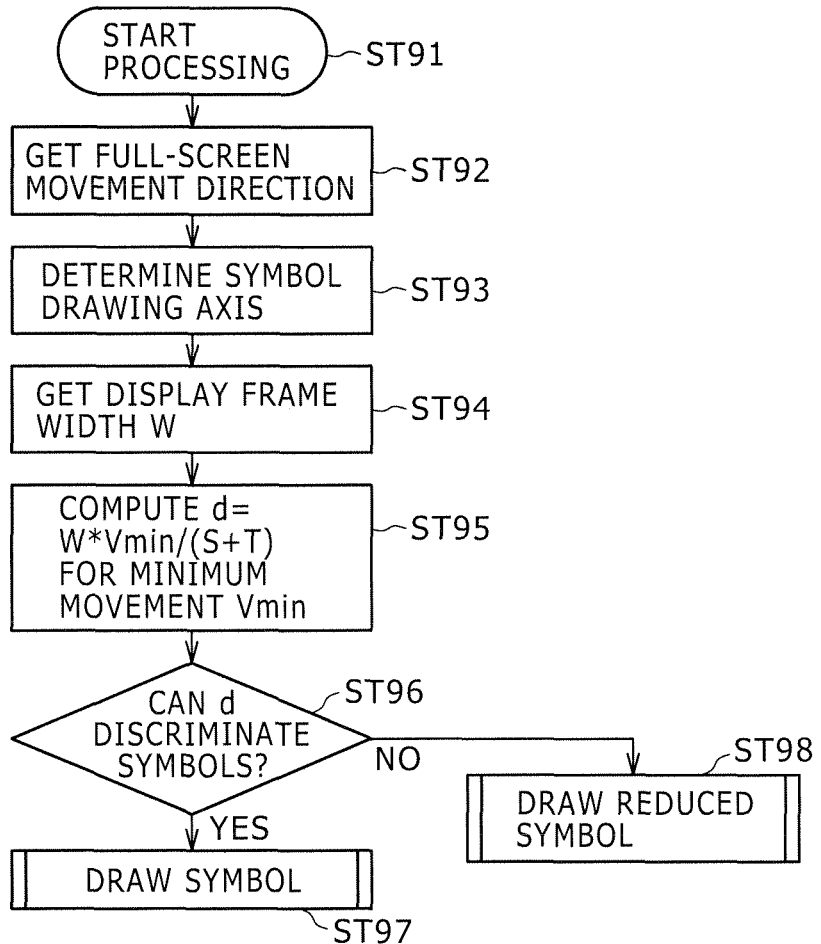
FIG. 28 is a flowchart indicative of an exemplary processing procedure to be executed by the symbol drawing block.

The flowchart shown in FIG. 28 is indicative of an exemplary processing procedure to be executed by the symbol drawing block 105A. In the step ST91, the symbol drawing block 105A starts processing and then moves to the processing of the step ST92. In the step ST92, the symbol drawing block 105A obtains a full-screen movement direction. For example, the movement direction is horizontal, vertical, or oblique. In this case, the symbol drawing block 105A obtains the full-screen movement direction on the basis of the full-screen movement (the motion vector) of each screen computed by the full-screen movement computation block 103, for example.

Next, in the step ST93, the symbol drawing block 105A determines a symbol drawing axis. In this case, the symbol drawing block 105A determines a symbol drawing axis such that the symbol drawing axis corresponds to the full-screen movement direction obtained in the step ST92. For example, if the full-screen movement direction is horizontal, then the symbol drawing axis is determined in the horizontal direction. Then, the symbol drawing block 105A obtains size W of a display frame, namely, above-mentioned length W in the full-screen movement direction of the display area of the representative image in an output device. The information about this length W is given by the user or automatically given from the output device through the output device interface (I/F) 106.

Next, in the step ST95, the symbol drawing block 105A computes the distance d by the above-mentioned equation (1) for the minimum movement Vmin of the frame. Then, in the step ST96, the symbol drawing block 105A determines whether the computed distance d is a value (2 for example) that can discriminate the drawing symbol or not. If the distance d is smaller than the size of the drawing symbol, the drawn symbol may be difficult for the user to recognize.

If the distance d is found to be a value that allows the discrimination of the drawing symbol, then the symbol drawing block 105A moves to the symbol drawing processing of the step ST97. The detailed description of the symbol drawing processing to be executed in the step ST97 is skipped. This symbol drawing processing is generally the same as those indicated by the flowcharts shown in FIG. 4, FIG. 8, and FIG. 13.

Figure 29:
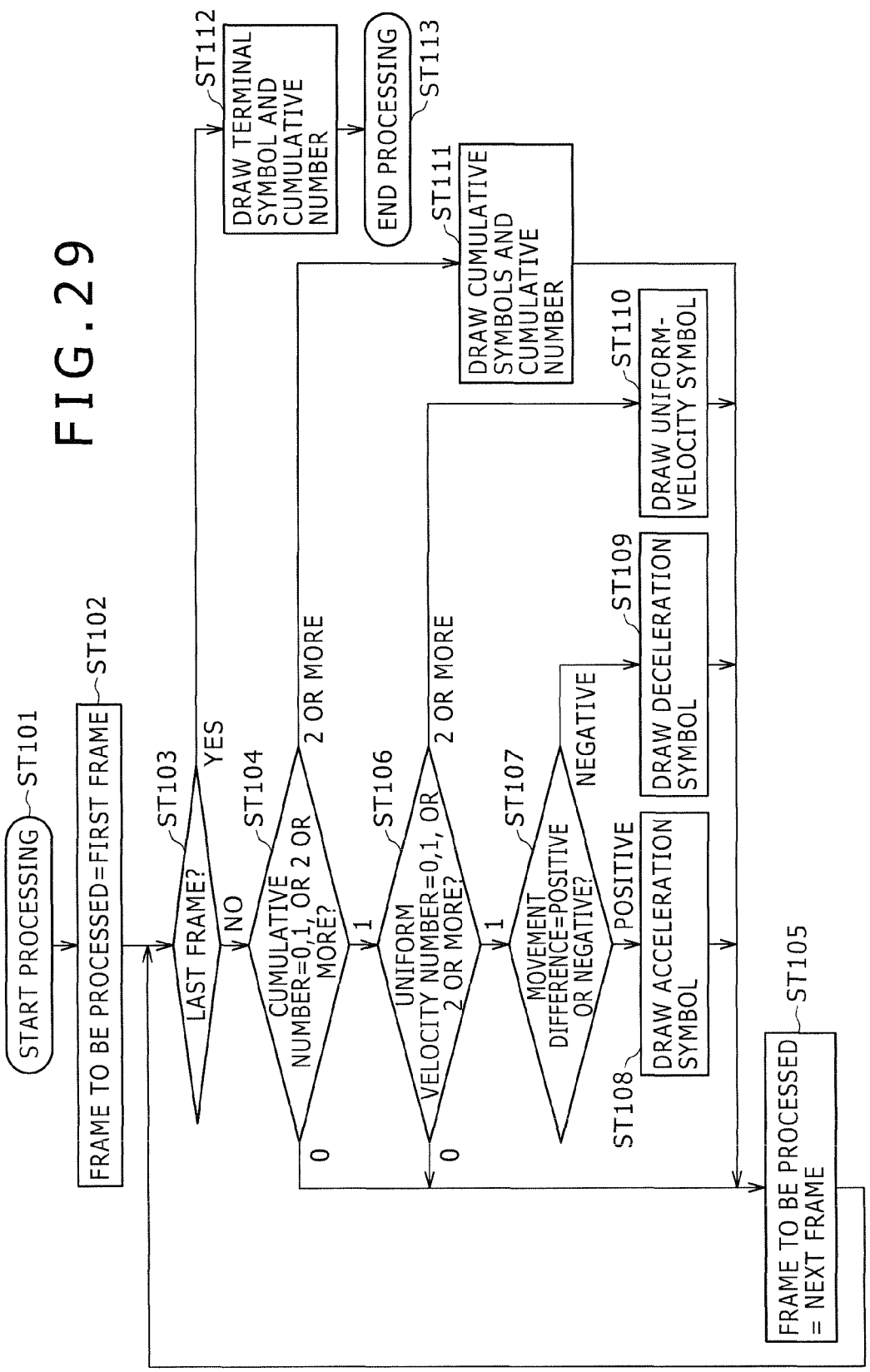
FIG. 29 is a flowchart indicative of another exemplary processing procedure to be executed by the symbol drawing block.

If the distance d is found not to be a value that allows the discrimination of the drawing symbol in the step ST96, then the symbol drawing block 105A moves to the processing of reduced symbol drawing of the step ST98. The flowchart shown in FIG. 29 is indicative of the reduced symbol drawing processing of the step ST98 to be executed according to the flowchart shown in FIG. 28.

In the step ST101, the symbol drawing block 105A starts processing and then moves to the processing of the step ST102. In the step ST102, the symbol drawing block 105A sets the processing frame (the processing screen) to the first frame (the first screen).

Next, in the step ST103, the symbol drawing block 105A determines whether the processing frame is the last frame (the last screen) or not. If the processing frame is found not to be the last frame, the symbol drawing block 105A moves to the processing of the step ST104. In the step ST104, the symbol drawing block 105A determines whether the cumulative number is 0, 1, or 2 or more.

If the cumulative number is found to be 0, the symbol drawing block 105A sets the processing frame to the next frame in the step ST105 without executing symbol drawing and then returns to the processing of the step ST103. If the cumulative number is found to be 1, then the symbol drawing block 105A moves to the processing of the step ST106. In the step ST106, the symbol drawing block 105A determines whether the uniform velocity number of the current frame is 0, 1, or 2 or more.

If the uniform velocity number is found to be 0, the symbol drawing block 105A sets the processing frame to the next frame in the step ST105 without executing symbol drawing and then returns to the processing of the step ST103. If the uniform velocity number is found to be 1, then the symbol drawing block 105A moves to the processing of the step ST107. In the step ST107, the symbol drawing block 105A determines whether the movement difference is positive or negative.

If the movement difference is positive, the symbol drawing block 105A moves to the processing of the step ST108. In the step ST108, the symbol drawing block 105A draws an acceleration symbol, as a symbol, indicative that the screen movement is accelerating, at the position corresponding to the current frame (the current screen) of the representative image (the union image). On the other hand, if the movement difference is found to be negative, the symbol drawing block 105A moves to the processing of the step ST109. In the step ST109, the symbol drawing block 105A draws a deceleration symbol, as a symbol, indicative that the screen movement is decelerating, at the position corresponding to the current frame (the current screen) of the representative image (the union image). Then, after the processing of the step ST108 or the step ST109, the symbol drawing block 105A sets the processing frame to the next frame in the step ST105 and then returns to the processing of the step ST103.

If the uniform velocity number is found to be 2 or more in the step ST106, the symbol drawing block 105A draws a uniform velocity symbol, as a symbol, indicative that the screen movement is uniform velocity, at the position corresponding to the current frame (the current screen) of the representative image (the union image). Then, after the processing of the step ST110, the symbol drawing block 105A sets the processing frame to the next frame in the step ST105 and then returns to the processing of the step ST103.

If the cumulative number is 2 or more in the step ST104, then the symbol drawing block 105A moves to the processing of the step ST111. In the step ST111, the symbol drawing block 105A draws a cumulative symbol, as a symbol, at the position corresponding to the current frame (the current screen) of the representative image (the union image). This cumulative symbol can be distinguished from the above-mentioned normal symbol by shape, size, pattern, or color. In addition, in the step ST111, the symbol drawing block 105A draws a cumulative number at the position corresponding to the position at which the cumulative symbol has been drawn. Then, after the processing of the step ST111, the symbol drawing block 105A sets the processing frame to the next frame and returns to the processing of the step ST103.

If the processing frame is found to be the last frame in the step ST103, then the symbol drawing block 105A moves to the processing of the step ST112. In the step ST112, the symbol drawing block 105A draws a terminal symbol, as a symbol, at the position corresponding to the current frame (=the last frame) of the representative image (the union image). This terminal symbol can be distinguished from the above-mentioned normal symbol and cumulative symbol by shape, size, pattern, or color. At the same time, in the step ST112, the symbol drawing block 105A further draws a cumulative number at the position corresponding to the position at which the terminal symbol has been drawn. Then, after the processing of the step ST112, the symbol drawing block 105A ends the processing in the step ST113.

Figures 30, 31:
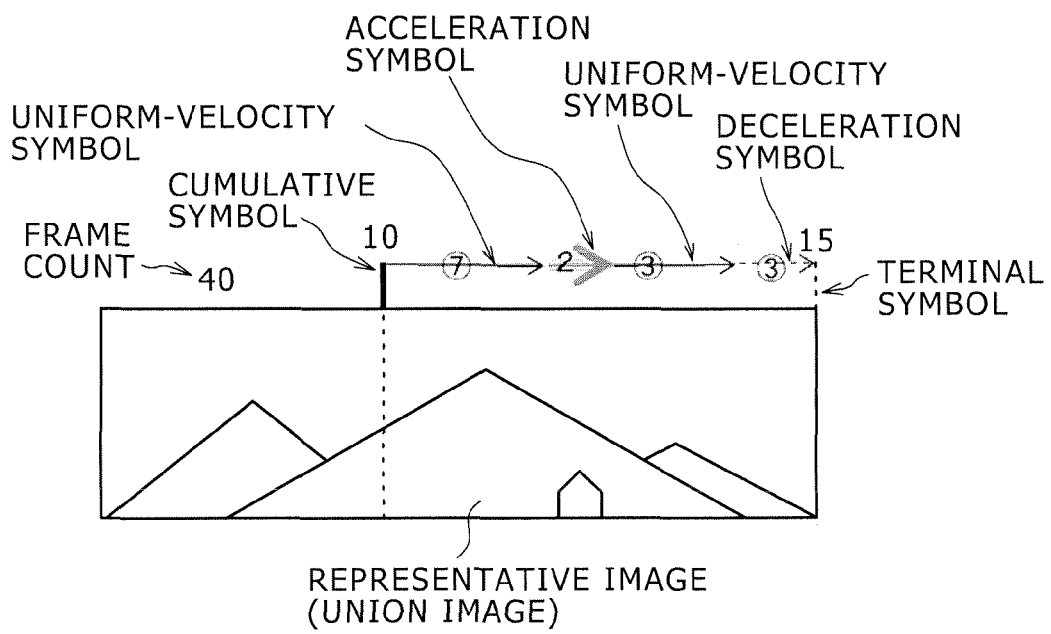
FIG. 30 is a diagram illustrating an exemplary drawing drawn by the symbol drawing processing.
FIG. 31 is a diagram illustrating variations of reduced symbols of acceleration, uniform velocity, and deceleration.
Figure 32A:
FIGS. 32A, 32B, 32C, 32D, 32E, and 32F are diagrams illustrating exemplary drawings drawn by use of reduced symbols.
Figure 32B:
Figure 32C:
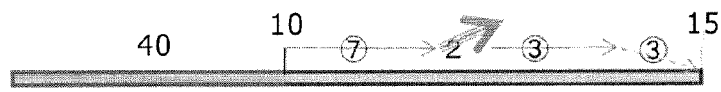
Figure 32D:
Figure 32E:
Figure 32F:
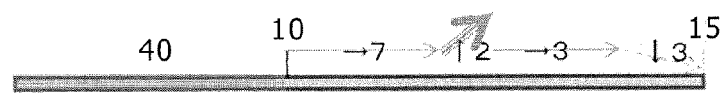
Figure 33A:
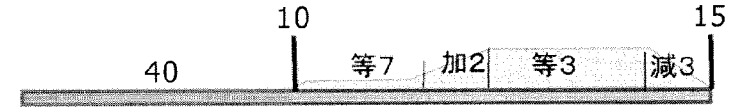
FIGS. 33A, 33B, and 33C are diagrams illustrating other exemplary drawings drawn by use of reduced symbols.
Figure 33B:
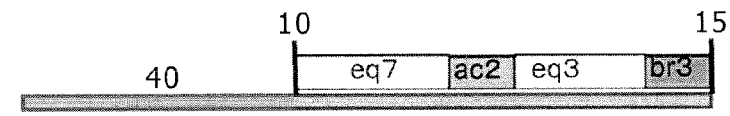
Figure 33C:
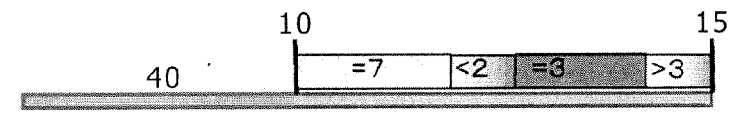

Referring to FIG. 30, there is shown an exemplary drawing of each symbol and cumulative number if the cumulative number, movement difference, and uniform velocity number of each frame (screen) are as shown in FIG. 27 when the number of frames (screens) making up a predetermined scene is 40. It should be noted that, in the exemplary drawing shown in FIG. 30, the frame continuation numbers of uniform velocity, acceleration, and deceleration are displayed, but this display need not be executed.

The output device interface 106 supplies the image data supplied from the symbol drawing block 105A, namely, the image signal (the image data) of the representative image (the union image) with a symbol indicative of full-screen movement drawn on the rim, to an output device, such as an image display apparatus or a recording apparatus. In the image display apparatus for example, the representative image (the union image) with the symbol indicative of full-screen movement drawn on the rim is displayed. In the recording apparatus for example, the image signal of the symbol drawn representative image of each scene is recorded to a recording media as related with each scene of the image signal inputted in the image input block 101.

Exemplary Operation of Image Processing Apparatus

The following describes an exemplary operation of the image processing apparatus 100A shown in FIG. 25. An image signal to be processed is inputted through the image input block 101. This image signal to be processed is obtained by taking a subject with an imaging device (a camera) for example and supplied directly from the imaging device (the camera) or from a predetermined recording media.

In the image input block 101, the inputted image signal is processed to detect a scene change point and the processed image signal is divided for each scene. Then, in the image input block 101, the image signal for each scene is sequentially supplied to the representative image creation block 102 and the full-screen movement computation block 103.

In the representative image creation block 102, the full-screen movement computation block 103, the cumulative number computation block 104, the uniform velocity number computation block 107, and the symbol drawing block 105A, each scene is sequentially set to the scene to be processed (the predetermined scene) and is processed. Namely, in the representative image creation block 102, the image signal of the predetermined scene is processed, a union image obtained by linking the images of the screens (the frames) making up this predetermined scene is created, and the created union image is set as the representative image of the predetermined scene.

In the full-screen movement computation block 103, the image signal of the predetermined scene is processed to compute the full-screen movement (the motion vector) of each screen in this predetermined scene. The full-screen movement of each screen in the predetermined scene is supplied to the cumulative number computation block 104. In the cumulative number computation block 104, the cumulative number and the total value of each screen in the predetermined scene are computed on the basis of the full-screen movement of each screen in the predetermined scene (refer to FIG. 2 and FIG. 7). Further, in the uniform velocity number computation block 107, the uniform velocity number and the movement difference of each screen in the predetermined scene are computed on the basis of the full-screen movement of each screen in the predetermined scene (refer to FIG. 26).

The cumulative number and the total value of each screen in the predetermined scene computed in the cumulative number computation block 104 are supplied to the symbol drawing block 105A. The uniform velocity number and the movement difference of each screen in the predetermined scene computed in the uniform velocity number computation block 107 are supplied to the symbol drawing block 105A. Also, to the symbol drawing block 105A, the image signal (the image data) of the representative image (the union image) created in the representative image creation block 102 is supplied. In this symbol drawing block 105A, a symbol indicative of the full-screen movement is drawn on the rim of the representative image (the union image) on the basis of the cumulative number, the uniform velocity, and the movement difference of each screen in the predetermined scene (refer to FIG. 28 and FIG. 29).

In this case, the distance d between the symbols closest to each other on the display area is computed. Then, if the value of this distance d allows the discrimination of the drawn symbol, then a normal symbol is drawn as a symbol at the position corresponding to the screen of the representative image (the union image) with the cumulative number being 1 (refer to FIG. 4, FIG. 8, and FIG. 13). Also, if the value of the distance d does not allow the discrimination of the drawn symbol, then an acceleration symbol, a uniform velocity symbol, and deceleration symbol are drawn as reduced symbols at the position corresponding to the screen of the representative image (the union image) with the cumulative number being 1 and the uniform velocity number being 1 or more (refer to FIG. 29).

In the screen with the cumulative number being 2 or more, a cumulative symbol is drawn as a symbol at the position corresponding to that screen of the representative image (the union image). At the same time, a cumulative number is drawn accordingly. Further, in the terminal screen, a terminal symbol is drawn as a symbol at the position corresponding to that screen and, at the same time, a cumulative number is drawn accordingly.

In the symbol drawing block 105A, the image signal (the image data) of the representative image (the union image) with a symbol indicative of the full-screen movement drawn on the rim is obtained for each scene, the obtained image signal (the image data) being supplied to the output device interface (I/F) 106. Then, the output device interface 106 supplies the image signal supplied from the symbol drawing block 105A, namely the image signal (the image data) of the representative image with a symbol indicative of the full-screen movement drawn on the rim, to an output device such as an image display apparatus or a recording apparatus.

Consequently, in the image display apparatus for example, the representative image (the union image) with the symbol indicative of full-screen movement drawn on the rim is displayed. In the recording apparatus for example, the image signal of the symbol drawn representative image of each scene is recorded to a recording media as related with each scene of the image signal inputted in the image input block 101.

As described above, in the image processing apparatus 100A shown in FIG. 25, the image signal of a predetermined scene is processed by the representative image creation block 102 to create a union image, as a representative image, with the images of the screens making up this predetermined scene linked with each other. Also, the image signal of a predetermined scene is processed by the full-screen movement computation block 103 to compute the full-screen movement of each screen in this predetermined scene. Further, the cumulative number and the movement total value of each screen in the predetermined scene are computed by the cumulative number computation block 104 on the basis of the computed full-screen movement of each screen in the predetermined scene. In addition, the uniform velocity number and the movement difference of each screen in the predetermined scene are computed by the uniform velocity number computation block 107 on the basis of the computed full-screen movement of each screen in the predetermined scene.

Next, a symbol indicative of the full-screen movement is drawn by the symbol drawing block 105A on the rim of the representative image (the union image) created by the representative image creation block 102 on the basis of the computed cumulative number, movement difference, and uniform velocity number of each screen in the predetermined scene. Therefore, the above-mentioned novel configuration allows not only the understanding of the entire image in a scene but also the understanding of the movement of each screen in a scene. Namely, the above-mentioned configuration allows the user not only to see "what is displayed" in the scene but also to overview "what is displayed how."

In the image processing apparatus 100A shown in FIG. 25, symbols of acceleration, uniform velocity, and deceleration are drawn as the reduced symbols if the value of the distance d between the symbols closest to each other on the display area does not allow the discrimination of the drawn symbols (the normal symbols). Hence, if the display size of a representative image in an output device is relatively small, the number of symbols to be drawn can be decreased, thereby preventing the congestion of symbols that possibly making it difficult for the user to understand a full-screen movement. At the same time, the above-mentioned configuration allows the user to easily understand the acceleration period, uniform velocity period, and deceleration period of a full-screen movement.

It should be noted that the reduced symbols of acceleration, uniform velocity, and deceleration shown in the exemplary drawing of FIG. 30 are illustrative only and therefore not restricted thereto. For example, as shown in FIG. 31, the reduced symbols of acceleration, uniform velocity, and deceleration may include graphics, symbols, thickness of arrow, direction of arrow, color of arrow, linguistic symbol (kanji [加|等|減], Alphabet [acc|eq|br]), and different color overlapping of arrow. Although not shown, a display technique based on blinking or moving icons is applicable depending upon the form of an output device.

FIGS. 32A through 32F show drawing examples based on various reduced symbols. In these examples, the direction of each arrow may be upward or downward relative to the reference line. As described above, by use of the same algorithm as that for drawing a normal symbol having a length corresponding to the magnitude of the screen movement, an arrow along the envelope line (refer to FIG. 32D) may be used to express a rough distribution of the movements of screens. In addition, is possible to display symbols by use of polygons and the color and gradation of oblongs.

In the above-mentioned reduced symbol drawing processing executed in the image processing apparatus 100A shown in FIG. 25, the number of symbols is remarkably decreased at the time of uniform velocity movement of an imaging device (a camera). In this case, however, it is possible that acceleration symbols and deceleration symbols are drawn in a congested manner. The visibility of congested symbols may be ensured by properly designing symbol shapes or further reducing the number of acceleration symbols and deceleration symbols by any of the following techniques.

In one technique, it is detected beforehand that 1 continues in the uniform velocity number and an acceleration symbol or a deceleration symbol is drawn only with a timing of the last 1 in continuation. In the other technique, a difference from the frame preceding a movement difference is computed. The computed difference is called movement acceleration difference. On the basis of this movement acceleration difference, an acceleration uniform velocity number is computed in the same manner as the processing shown in the flowchart of FIG. 26. The computed acceleration uniform velocity number may be used in the same manner as the above-mentioned uniform velocity number (refer to FIG. 29) to draw an acceleration symbol and a deceleration symbol.

In the image processing apparatus 100A shown in FIG. 25, an acceleration symbol or a deceleration symbol is drawn on a screen with the uniform velocity number being 1 and a uniform velocity symbol is drawn on a screen with the uniform velocity number being 2 or more by the symbol drawing block 105A (refer to FIG. 29). Generally, however, an acceleration symbol or a deceleration symbol may be drawn on a screen with the uniform velocity number being 1 to M (M being an integer of 1 or more) and a uniform velocity symbol may be drawn on a screen with the uniform velocity number being more than M. In this case, the user may set the value of M as required through a user operation block, not shown.

4. Fourth Embodiment

In the symbol drawing processing executed in the image processing apparatus 100A shown in FIG. 25, the processing of reduced symbol drawing is executed if the distance d between the symbols closest to each other on a display area does not have a value that allows the discrimination of the drawn symbols (refer to the step ST98 shown in FIG. 28). However, if this distance d does not have a value that allows the discrimination of the drawn symbols, the processing may be optionally executed by the user for executing reduced symbol drawing or thin-out symbol drawing.

Exemplary Configuration of Image Processing Apparatus

Figure 34:
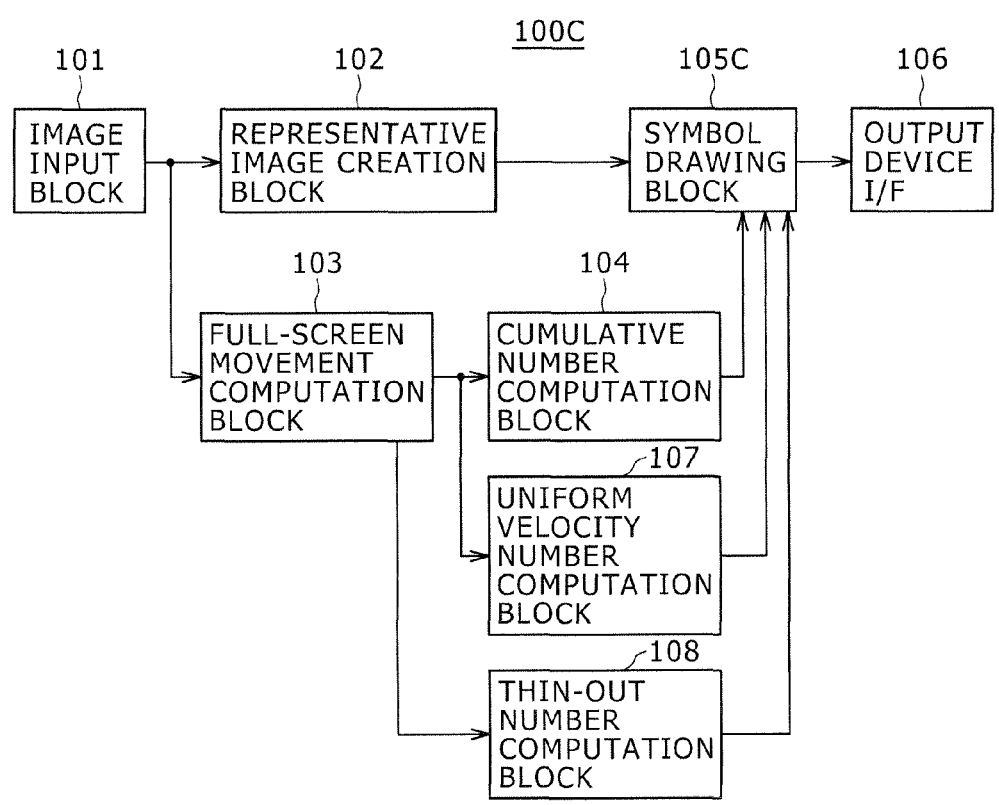
FIG. 34 is a block diagram illustrating an image processing apparatus practiced as a fourth embodiment of the invention.

Referring to FIG. 34, there is shown an exemplary configuration of an image processing apparatus 100C practiced as the fourth embodiment of the invention. The image processing apparatus 100C has an image input block 101, a representative image creation block 102, a full-screen movement computation block 103, a cumulative number computation block 104, a symbol drawing block 105C, an output device interface (I/F) 106, a uniform velocity number computation block 107, and a thin-out number computation block 108. With reference to FIG. 34, components similar to those previously described with reference to FIG. 1, FIG. 16, and FIG. 25 are denoted by the same reference numerals and the detailed description thereof is appropriately skipped.

Figure 35:
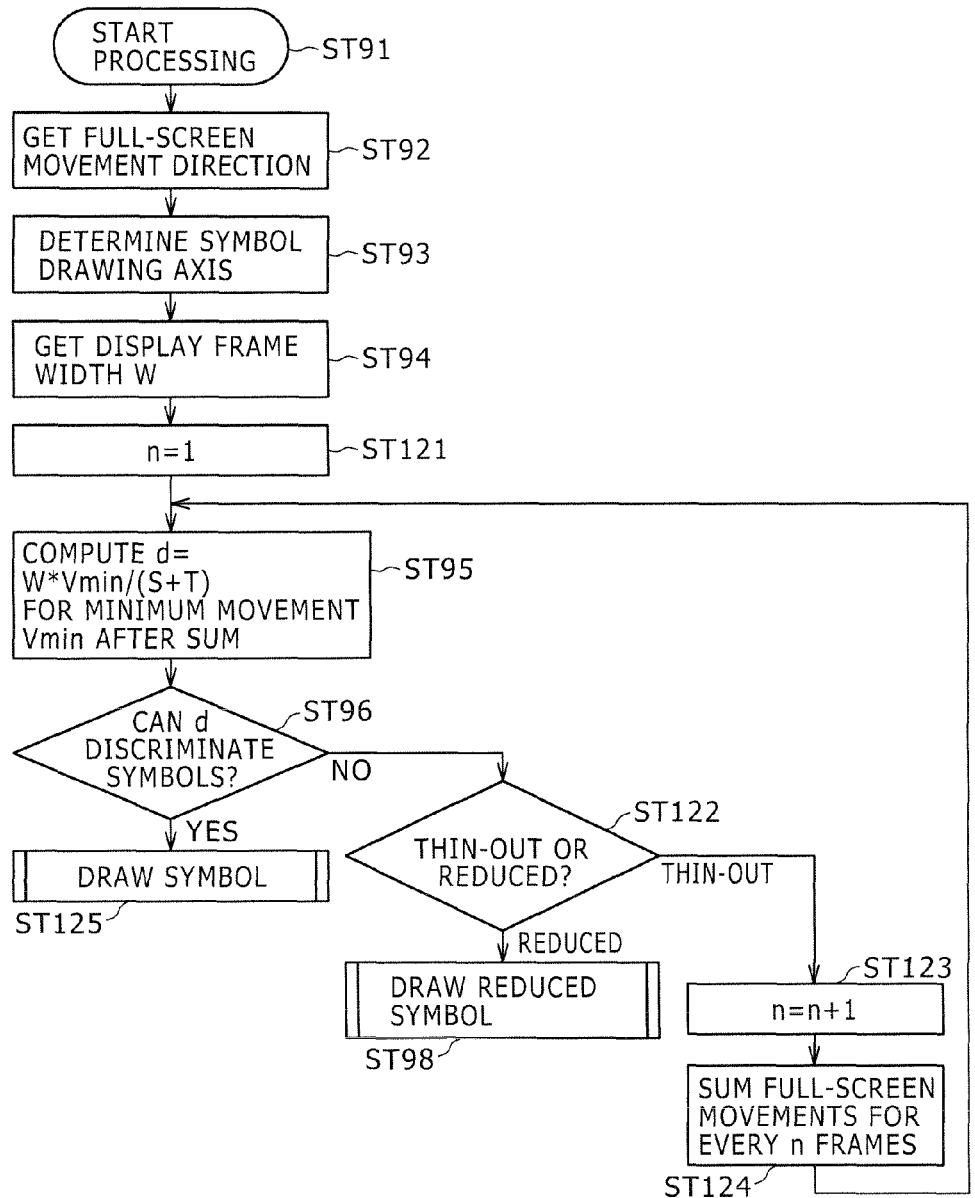
FIG. 35 is a flowchart indicative of an exemplary processing procedure to be executed by the symbol drawing processing.
Figure 36:
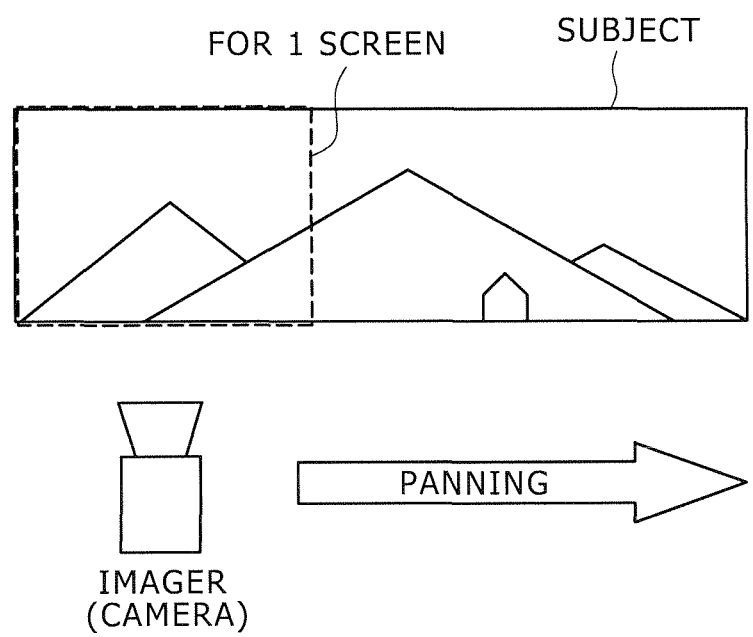
FIG. 36 is a diagram illustrating an example in which a subject extending in the horizontal direction is taken with an imaging device (a camera) by use of a pan technique.

The flowchart shown in FIG. 35 is indicative of an exemplary processing procedure to be executed by the symbol drawing block 105C in the above-mentioned case. With reference to FIG. 35, steps similar to those previously described with reference to FIG. 28 are denoted by the same reference numerals and the detailed description thereof is skipped. After obtaining size W of the display frame in the step ST94, the symbol drawing block 105C sets the combined total number n of frames to 1 in the step ST121 and then moves to the processing of the step ST95.

Next, in the step ST95, the symbol drawing block 105C computes the distance d for frame minimum movement Vmin by the above-mentioned equation (1). Then, in the step ST96, the symbol drawing block 105C determines whether the computed distance d has a value (2 for example) that allows the discrimination of drawn symbols or not. If the distance d is smaller than the size of drawn symbols, it may lower the visibility of drawn symbols for the user.

If the distance d is found not to have a value that allows the discrimination of drawn symbols in the step ST96, then the symbol drawing block 105C determines in the step ST122 whether the user setting is reduced symbol drawing or thin-out drawing. If the user setting is found to be reduced symbol drawing, then the symbol drawing block 105C moves to the processing of the reduced symbol drawing of the step ST98.

On the other hand, if the user setting is found to be thin-out drawing, then the symbol drawing block 105C moves to the processing of the step ST123. In the step ST123, the symbol drawing block 105C increments the frame combined total number n by 1. Next, the symbol drawing block 105C totals the full-screen movements every n frames in the step ST124 and then returns to the processing of the step ST95.

If the distance d is found to have a value that allows the discrimination of drawn symbols in the step ST96, then the symbol drawing block 105C moves to the processing of the step ST125. This processing of the step ST125 corresponds to the processing of the step ST48 of the flowchart shown in FIG. 18 (refer to FIG. 19).

The embodiments of the present invention are applicable to image processing apparatuses configured to create representative images (thumbnails) of each scene from the image signal of each scene.

The present application contains subject matter related to that disclosed in Japanese Priority Patent Applications JP 2010-063661 filed in the Japan Patent Office on Mar. 19, 2010, and JP 2010-063662 filed in the Japan Patent Office on Mar. 19, 2010, the entire contents of which are hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. An image processing apparatus comprised of a processor programmed to operate as:
a representative image creation block configured to create, as a representative image, a union image with images of screens making up a predetermined scene linked with each other;
a symbol drawing block configured, on the basis of a full-screen movement of each screen in said predetermined scene, to draw a symbol indicative of the full-screen movement on a rim of said representative image created by said representative image creation block, wherein
said symbol drawing block draws the symbol indicative of the full-screen movement in accordance with a display size of said representative image to be displayed on an output device; and
a cumulative number computation block configured to compute a cumulative number of each screen on the basis of the full-screen movement of each screen in said predetermined scene, wherein,
if an accumulation is found present in a predetermined screen, said cumulative number computation block sets the cumulative number of said predetermined screen to 0 and increments a cumulative counter by 1 and, if no accumulation is found present, sets a cumulative number of an immediately preceding screen to a value of said cumulative counter, sets the cumulative number of said predetermined screen to 1 and the value of said cumulative counter to 1, and a cumulative number of a last screen to the value of said cumulative counter, and,
on the basis of the cumulative number of each screen computed by said cumulative number computation block, said symbol drawing block draws a symbol indicative of a full-screen movement on the rim of said representative image created by said representative image creation block.

2. The image processing apparatus according to claim 1, wherein, if a cumulative number of a predetermined screen is at least 1, said symbol drawing block draws said symbol at a position corresponding to said predetermined screen on the rim of said representative image.

3. The image processing apparatus according to claim 2, wherein,
if the cumulative number of said predetermined screen is at least 1 and not larger than N, N being an integer of at least 1, said symbol drawing block draws a normal symbol as said symbol at a position corresponding to said predetermined screen on the rim of said representative image; if the cumulative number of said predetermined screen is larger than N, said symbol drawing block draws a cumulative symbol as said symbol at a position corresponding to said predetermined screen on the rim of said representative image.

4. The image processing apparatus according to claim 3, wherein
said symbol drawing block draws, as said symbol, a symbol shaped in a line segment extending in a direction orthogonal to a direction of said full-screen movement and
sets a length of said normal symbol to be drawn with the cumulative number of said predetermined screen being not larger than N to a length corresponding to a magnitude of the full-screen movement of said predetermined screen.

5. The image processing apparatus according to claim 4, wherein,
said symbol drawing block sets a length h of said normal symbol to be drawn with the cumulative number of said predetermined screen being at least 1 and not larger than N to H*Mv/Mvmax, where H is the length of a direction orthogonal to the direction of said full-screen movement in a display area of said rim in said output device, Mvmax is a maximum movement among said full-screen movements, and Mv is a full-screen movement of each screen.

6. The image processing apparatus according to claim 3, wherein
said symbol drawing block determines a proximity between said symbols to be drawn and, in accordance with a result of this determination, changes a drawing manner of said normal symbol to be drawn with the cumulative number of said predetermined screen being at least 1 and not larger than N.

7. The image processing apparatus according to claim 6, wherein
said symbol drawing block draws said normal symbol for every predetermined number of screens such that a distance between the said symbols to be drawn in the direction of said full-screen movement is in excess of a predetermined value in the display area in said output device.

8. The image processing apparatus according to claim 7, wherein
said symbol drawing block draws, as said symbol, a symbol shaped in a line segment extending in the direction orthogonal to the direction of said full-screen movement,
sets a length h of said normal symbol to be drawn with the cumulative number of said predetermined screen being at least 1 and not larger than N to H*Mv/Mvmax, where H is the length of a direction orthogonal to the direction of said full-screen movement in a display area of said rim in said output device, Mvmax is a maximum movement among said full-screen movements, and Mv is a full-screen movement of each screen, and
draws in dark said normal symbol to be drawn for every said predetermined number of screens and in light said normal symbol to be drawn in other screens.

9. The image processing apparatus according to claim 6, wherein,
if the distance between said symbols to be drawn in the direction of said full-screen movement is less than a predetermined value on the display screen of said output device, then said symbol drawing block draws an acceleration symbol in correspondence with an acceleration period in accordance with a full-screen movement difference between each screen from the immediately preceding screen, draws a uniform velocity symbol in correspondence with a uniform velocity period, and draws a deceleration symbol in correspondence with a deceleration period.

10. The image processing apparatus according to claim 9, further comprising:
a uniform velocity number computation block configured to compute a uniform velocity number of each screen on the basis of said full-screen movement difference between each screen from the immediately preceding screen in said predetermined scene, wherein,
if an accumulation is found present on a predetermined screen, said uniform velocity number computation block sets a uniform velocity number of said predetermined screen to 0 and increments a uniform velocity counter by 1; if an accumulation is found not present, said uniform velocity number computation block sets a uniform velocity number of the immediately preceding screen to a value of said uniform velocity counter, sets the uniform velocity number of said predetermined screen to 1, and sets the value of said uniform velocity counter to 1; and, if the uniform velocity number of said predetermined screen is at least 1 and not larger than M M being an integer of at least 1, said symbol drawing block draws one of said acceleration symbol and said deceleration symbol at a position corresponding to said predetermined screen on the rim of said representative image and, if the uniform velocity number of said predetermined screen is in excess of said M, said symbol drawing block draws said uniform velocity symbol at a position corresponding to said predetermined screen on the rim of said representative image.

11. The image processing apparatus according to claim 10, wherein said uniform velocity number computation block has cumulative means for accumulating said full-screen movement difference of each screen and determines whether said predetermined screen has a uniform velocity movement by determining whether a cumulative value of said cumulative means is within a threshold range and, if said predetermined screen is found not having a uniform velocity movement, resets the cumulative value of said cumulative means to 0.

12. The image processing apparatus according to claim 10, wherein said uniform velocity number computation block determines whether said predetermined screen has a uniform velocity movement by determining whether said full-screen movement difference of said predetermined screen is within a threshold range.

13. The image processing apparatus according to claim 6, wherein said symbol drawing block computes a distance d between symbols closest to each other on said display area by relation W*Vmin/(S+T) where S is a length of one screen in a direction of said full-screen movement, T is a total value of said full-screen movements, Vmin is a minimum movement when no accumulation is found in said full-screen movement, and W is a length of in the direction of said full-screen movement of a display area of said representative image in said output device, thereby determining the proximity of said symbols to each other on the basis of said distance d obtained as above.

14. The image processing apparatus according to claim 1, further comprising:

a full-screen movement computation block configured to process an image signal of said predetermined scene to compute a full-screen movement of each screen in said predetermined scene, wherein said symbol drawing block draws a symbol indicative of a full-screen movement on the rim of said representative image created by said representative image creation block on the basis of a full-screen movement of each screen in said predetermined scene computed by said full-screen movement computation block.

15. An image processing method performed by a processor, the method comprising the steps of:

creating, as a representative image, a union image with images of screens making up a predetermined scene linked with each other;

on the basis of a full-screen movement of each screen in said predetermined scene, drawing a symbol indicative of the full-screen movement on a rim of said representative image created in the representative image creating step, wherein, the symbol drawing step draws the symbol indicative of the full-screen movement in accordance with a display size of said representative image to be displayed on an output device; and computing a cumulative number of each screen on the basis of the full-screen movement of each screen in said predetermined scene, wherein, if an accumulation is found present in a predetermined screen, the cumulative number of said predetermined screen is set to 0 and a cumulative counter is incremented by 1 and, if no accumulation is found present, the cumulative number of an immediately preceding screen is set to a value of said cumulative counter, the cumulative number of said predetermined screen is set to 1 and the value of said cumulative counter is set to 1, and the cumulative number of a last screen is set to the value of said cumulative counter, and, on the basis of the computed cumulative number of each screen, said symbol drawing step draws a symbol indicative of a full-screen movement on the rim of said representative image created by said representative image creation block.

16. An image processing apparatus comprised of a processor programmed to operate as:

a representative image creation block configured to create, as a representative image, a union image with images of screens making up a predetermined scene linked with each other;

a symbol drawing block configured to draw a symbol indicative of a full-screen movement on a rim of said representative image created by said representative image creation block on the basis of a full-screen movement of each screen in said predetermined scene; and a cumulative number computation block configured to compute a cumulative number of each screen on the basis of the full-screen movement of each screen in said predetermined scene, wherein, if an accumulation is found present in a predetermined screen, said cumulative number computation block sets the cumulative number of said predetermined screen to 0 and increments a cumulative counter by 1 and, if no accumulation is found present, sets a cumulative number of an immediately preceding screen to a value of said cumulative counter, sets the cumulative number of said predetermined screen to 1 and the value of said cumulative counter to 1, and a cumulative number of a last screen to the value of said cumulative counter, and, on the basis of the cumulative number of each screen computed by said cumulative number computation block, said symbol drawing block draws a symbol indicative of a full-screen movement on the rim of said representative image created by said representative image creation block.

17. An image processing apparatus comprising:

representative image creation means for creating, as a representative image, a union image with images of screens making up a predetermined scene linked with each other;

symbol drawing means for drawing, on the basis of a full-screen movement of each screen in said predetermined scene, a symbol indicative of the full-screen movement on a rim of said representative image created by said representative image creation means, wherein, said symbol drawing means draws the symbol indicative of the full-screen movement in accordance with a display size of said representative image to be displayed on an output device; and a cumulative number computation means for computing a cumulative number of each screen on the basis of the full-screen movement of each screen in said predetermined scene, wherein, if an accumulation is found present in a predetermined screen, said cumulative number computation means sets the cumulative number of said predetermined screen to 0 and increments a cumulative counter by 1 and, if no accumulation is found present, sets a cumulative number of an immediately preceding screen to a value of said cumulative counter, sets the cumulative number of said predetermined screen to 1 and the value of said cumulative counter to 1, and a cumulative number of a last screen to the value of said cumulative counter, and, on the basis of the cumulative number of each screen computed by said cumulative number computation means, said symbol drawing block draws a symbol indicative of a full-screen movement on the rim of said representative image created by said representative image creation block.

18. An image processing apparatus comprising:

representative image creation means for creating, as a representative image, a union image with images of screens making up a predetermined scene linked with each other;

symbol drawing means for drawing a symbol indicative of a full-screen movement on a rim of said representative image created by said representative image creation means on the basis of a full-screen movement of each screen in said predetermined scene; and a cumulative number computation means for computing a cumulative number of each screen on the basis of the full-screen movement of each screen in said predetermined scene, wherein, if an accumulation is found present in a predetermined screen, said cumulative number computation means sets the cumulative number of said predetermined screen to 0 and increments a cumulative counter by 1 and, if no accumulation is found present, sets a cumulative number of an immediately preceding screen to a value of said cumulative counter, sets the cumulative number of said predetermined screen to 1 and the value of said cumulative counter to 1, and a cumulative number of a last screen to the value of said cumulative counter, and, on the basis of the cumulative number of each screen computed by said cumulative number computation means, said symbol drawing block draws a symbol indicative of a full-screen movement on the rim of said representative image created by said representative image creation block.

* * * * *